United States Patent
Rico Alvarino et al.

(10) Patent No.: US 10,587,362 B2
(45) Date of Patent: Mar. 10, 2020

(54) SUPPORT FOR MULTIPLE CODING SCHEMES

(71) Applicant: QUALCOMM Incorporated, San Diego, CA (US)

(72) Inventors: Alberto Rico Alvarino, San Diego, CA (US); Kapil Bhattad, Bangalore (IN); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/955,983

(22) Filed: Apr. 18, 2018

(65) Prior Publication Data

US 2019/0007162 A1    Jan. 3, 2019

(30) Foreign Application Priority Data

Jul. 3, 2017 (IN) .............................. 201741023328

(51) Int. Cl.
  *H04L 1/00* (2006.01)
  *H04W 28/04* (2009.01)
  *H04W 8/22* (2009.01)

(52) U.S. Cl.
  CPC .......... *H04L 1/0009* (2013.01); *H04L 1/0022* (2013.01); *H04L 1/0025* (2013.01); *H04L 1/0041* (2013.01); *H04L 1/0046* (2013.01); *H04L 1/0057* (2013.01); *H04W 8/22* (2013.01); *H04W 28/04* (2013.01)

(58) Field of Classification Search
  CPC ... H04L 1/0009; H04L 1/0022; H04L 1/0046; H04L 1/0041; H04L 1/0025; H04L 1/0057; H04W 28/04; H04W 8/22
  See application file for complete search history.

(56) References Cited

U.S. PATENT DOCUMENTS

| | | |
|---|---|---|
| 2008/0168332 A1 | 7/2008 | Palanki et al. |
| 2015/0312071 A1 | 10/2015 | Chen et al. |
| 2016/0165577 A1 | 6/2016 | Davydov et al. |
| 2017/0026976 A1 | 1/2017 | Yoo et al. |
| 2018/0007683 A1 | 1/2018 | You et al. |
| 2018/0316470 A1* | 11/2018 | Li ............................ H04B 7/06 |

FOREIGN PATENT DOCUMENTS

| | | |
|---|---|---|
| WO | 2017014846 A1 | 1/2017 |
| WO | 2017171396 A1 | 10/2017 |
| WO | 2017171956 A1 | 10/2017 |

OTHER PUBLICATIONS

International Search Report and Written Opinion—PCT/US2018/030946—ISA/EPO—dated Aug. 1, 2018.

* cited by examiner

*Primary Examiner* — Afshawn M Towfighi
(74) *Attorney, Agent, or Firm* — Qualcomm IP Dept.; James Hunt Yancey, Jr.

(57) ABSTRACT

A method of wireless communication of a user equipment (UE) includes communicating with a base station using a baseline channel code. The baseline code may include a tail-biting convolutional code (TBCC), or turbo code (TC). The method also includes sending information to the base station indicating a capability of the UE to support multiple channel codes. The method further includes receiving, from the base station, a configuration to operate with any one of the channel codes.

33 Claims, 20 Drawing Sheets

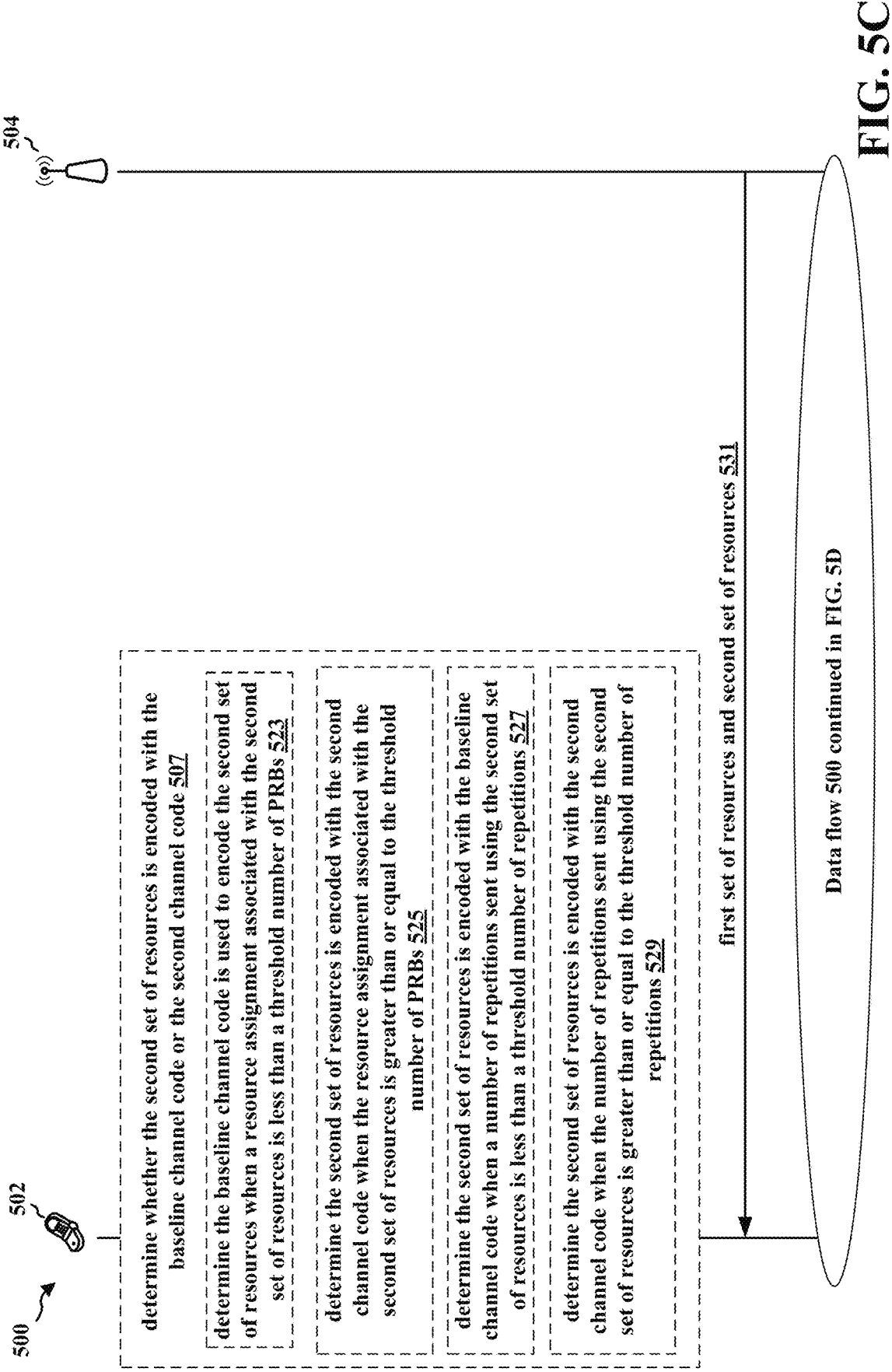

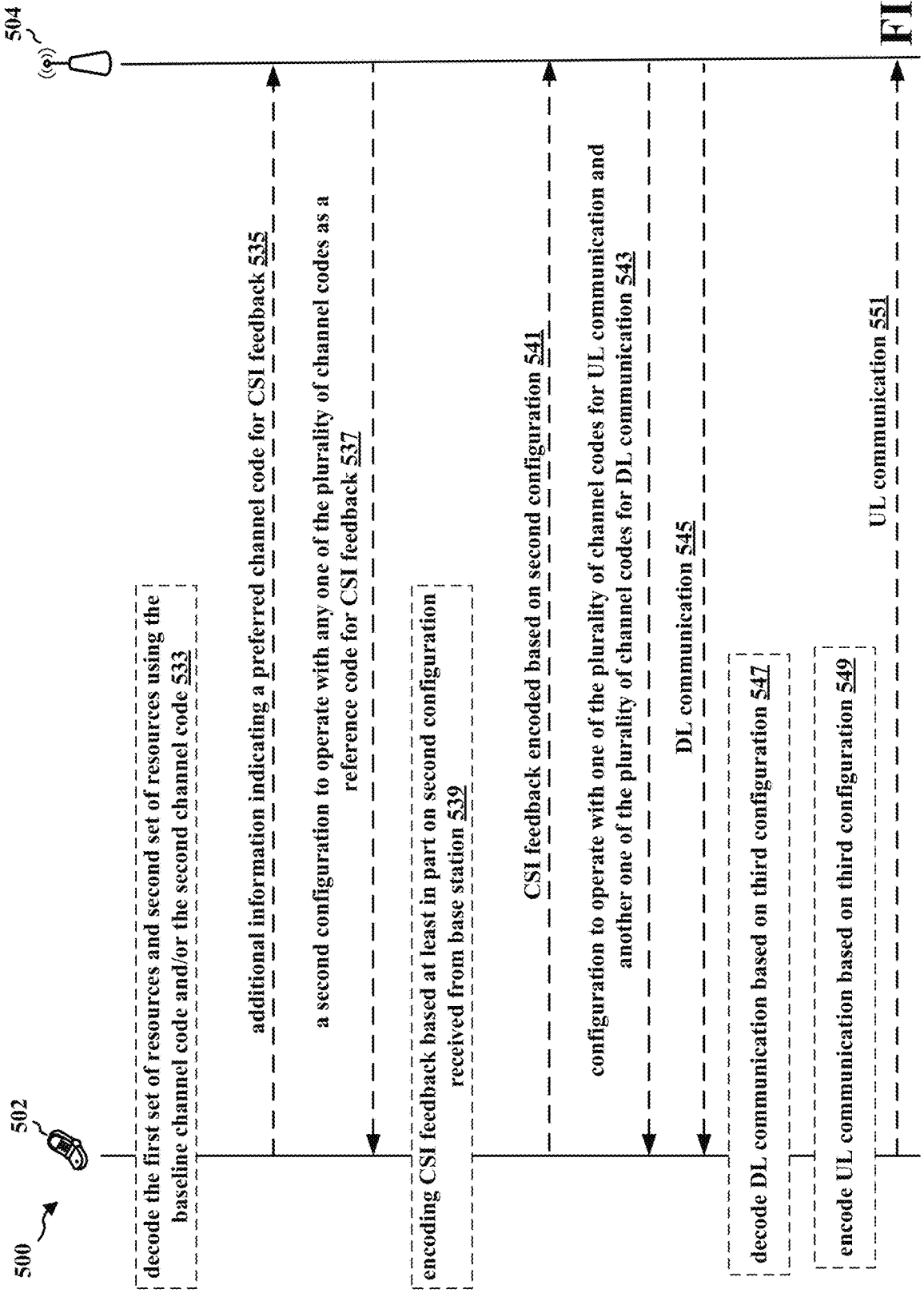

SUPPORT FOR MULTIPLE CODING SCHEMES

CROSS-REFERENCE TO RELATED APPLICATION(S)

This application claims the benefit of Indian Application Serial No. 201741023328, entitled "SUPPORT FOR MULTIPLE CODING SCHEMES" and filed on Jul. 3, 2017, which is expressly incorporated by reference herein in its entirety.

BACKGROUND

Field

The present disclosure relates generally to communication systems, and more particularly, to a wireless communication with support for multiple channel coding schemes.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

There are numerous channel coding schemes that are used for communication over shared channels. Such channel coding schemes include Turbo code (TC), tail biting convolutional code (TBCC), low density parity check code (LDPC), ultra-reliable low-latency code (URLLC), polar codes, etc. The use of particular channel codes may be based on the Radio Access Technology (RAT) selected with limited flexibility.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE may be configured with support for decoding multiple channel codes. This is useful because there are a variety of channel code specified for shared channels. More channel codes may also be developed as RATs evolve and more technologies are produced. While there is some overlap in codes for certain RATs, many RATs employ a different channel coding scheme. For example, a Turbo code may be used for LTE, a tail-biting convolutional code (TBCC) may be used for Narrow Band Internet-of-Things (NB-IoT), and a low density parity check code (LDPC) may be used for 5G NR. The determination of which channel code to use may be based on UE complexity and/or cost. For instance, for NB-IoT, many of NB devices may be low in complexity, so encoding data packets with a high performance code (e.g., TC) may not be feasible. The same may also be true with respect to certain types of communication. Unfortunately, although a UE may support multiple channel codes, the inability to switch between channel codes deprives the UE of its full capability.

To overcome the foregoing challenges and other issues, aspects of the present disclosure are directed to providing support for using multiple channel codes to make more efficient use of the capabilities of the UE.

In an aspect of the disclosure, a method, a computer-readable medium, and an apparatus are provided. In certain implementations, the apparatus may be a UE. The apparatus may communicate with a base station using a baseline channel code. The apparatus may send information to the base station indicating a capability of the UE to support a plurality of channel codes. In certain aspects, the plurality of channel codes may include the baseline channel code and one or more second channel codes. The apparatus may receive, from the base station, a configuration to operate with any one of the plurality of channel codes. The apparatus may receive a first set of resources and a second set of resources from the base station. In certain aspects, the first set of resources may be encoded with the baseline channel code and the second set of resources may be encoded with one of the baseline code or a second channel code of the one or more second channel codes.

In certain configurations, the apparatus may receive, from a base station, first broadcasted system information and second broadcasted system information. In certain aspects, the first broadcasted system information may be encoded with a first channel code. In certain aspects, the first broadcasted system information may include an indication that the second broadcasted system information is encoded with the second channel code. The apparatus may decode the second broadcasted system information based on the indication of the second channel code when the UE supports the second channel code.

In certain other implementations, the apparatus may be a base station. The apparatus may communicate with at least one UE using a baseline channel code. The apparatus may receive, from the at least one UE, information indicating a capability of the at least one UE to support a plurality of channel codes. In certain aspects, the plurality of channel codes may include the baseline channel code. The apparatus may decode the second broadcasted system information based on the indication of the second channel code when the UE supports the second channel code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5D illustrates a data flow between a UE and a base station in accordance with aspects of the present disclosure.

DETAILED DESCRIPTION

Figure 1:
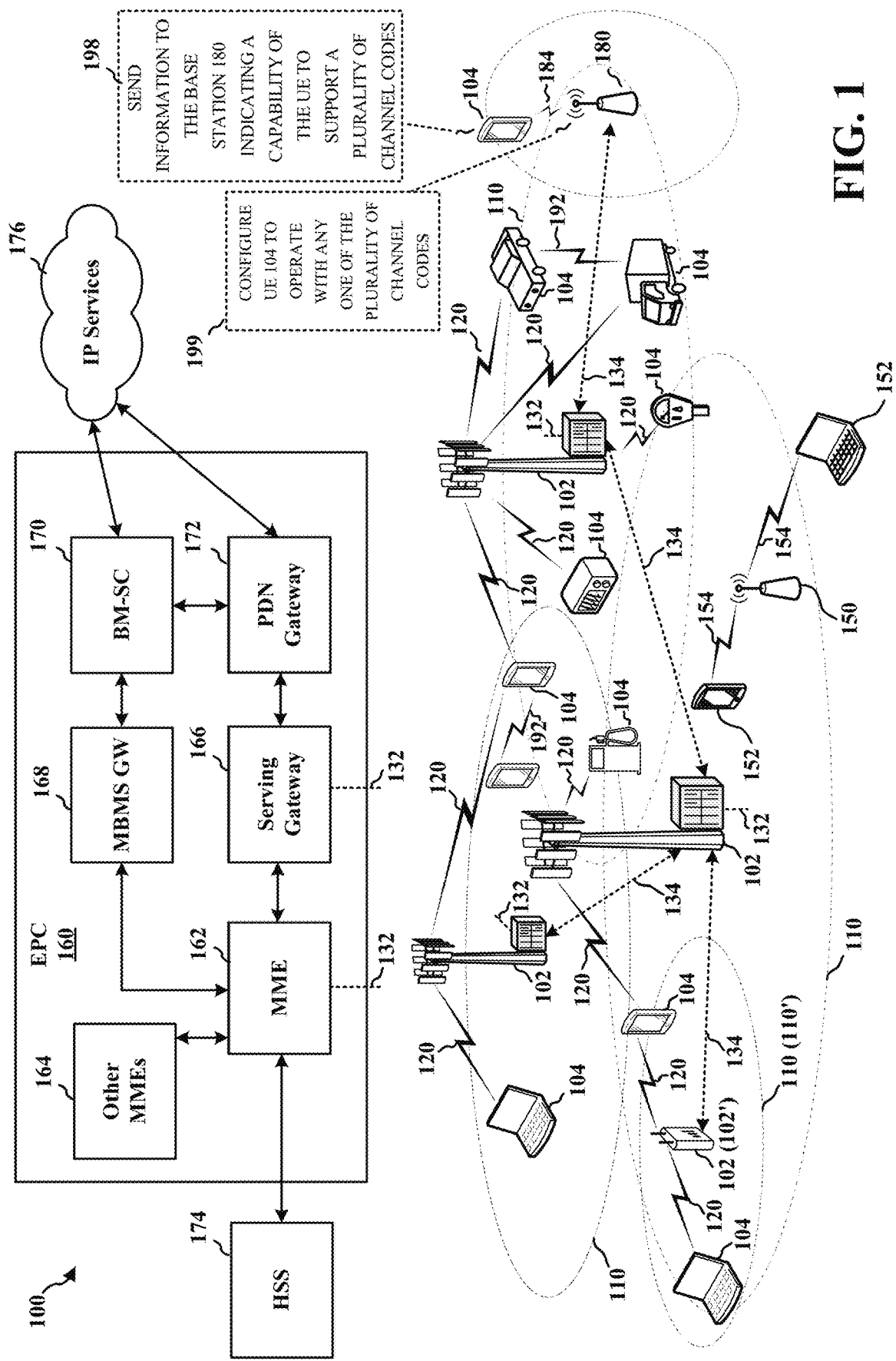
FIG. 1 is a diagram illustrating an example of a wireless communications system and an access network.
Figure 2:
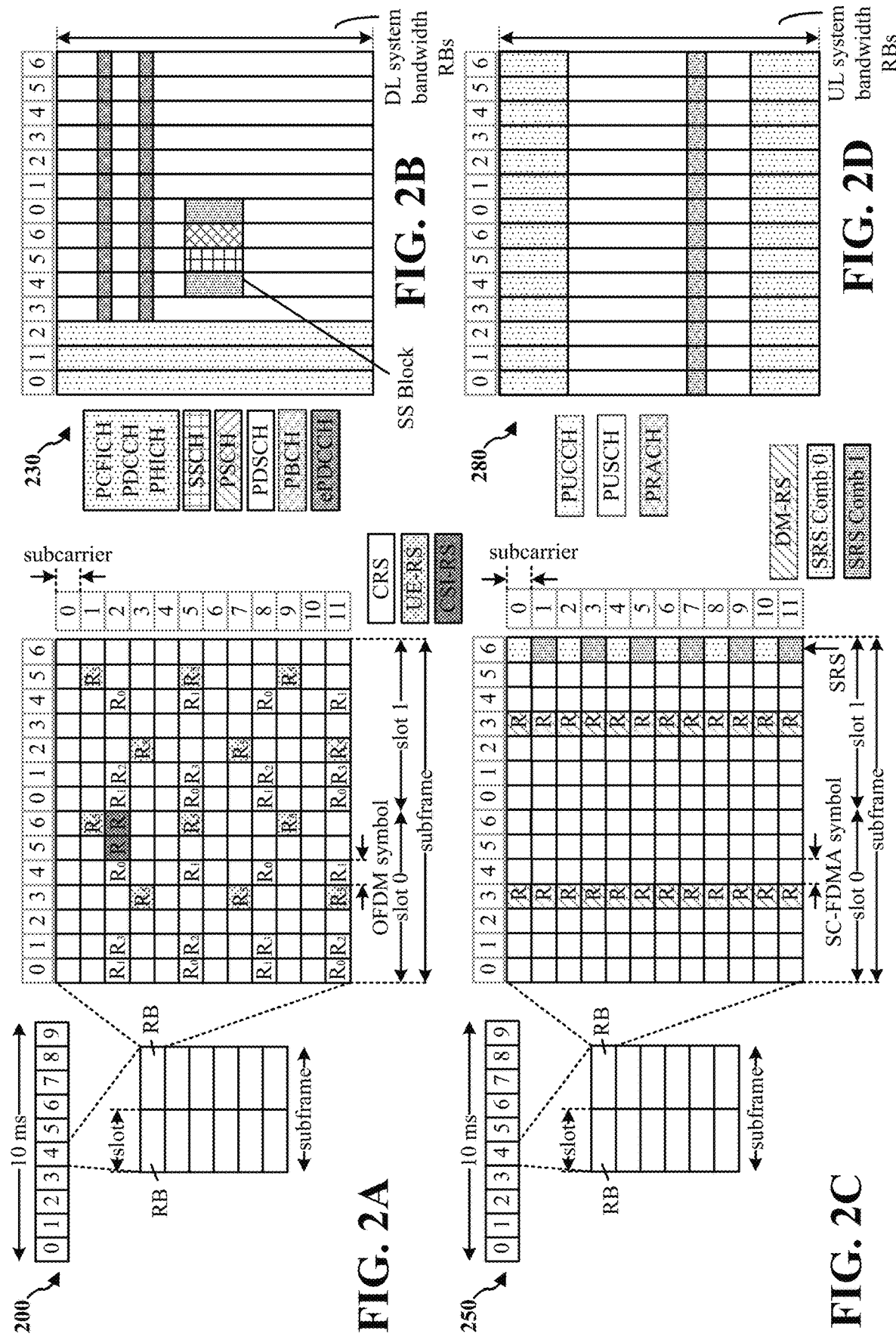
FIGS. 2A, 2B, 2C, and 2D are diagrams illustrating examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions:

transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to communicate with a base station using a baseline channel code. The UE 104 may also be configured to send information to the base station indicating a capability of the UE to support a plurality of channel codes. Additionally, the UE may be configured to receive a configuration to operate with any one of the plurality of channel codes (198), e.g., as described below in connection with any of FIGS. 2A-14. The base station 180 may be configured to send a configuration for the UE to operate with any one of the plurality of channel codes (199), e.g., as described below in connection with any of FIGS. 2A-14.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
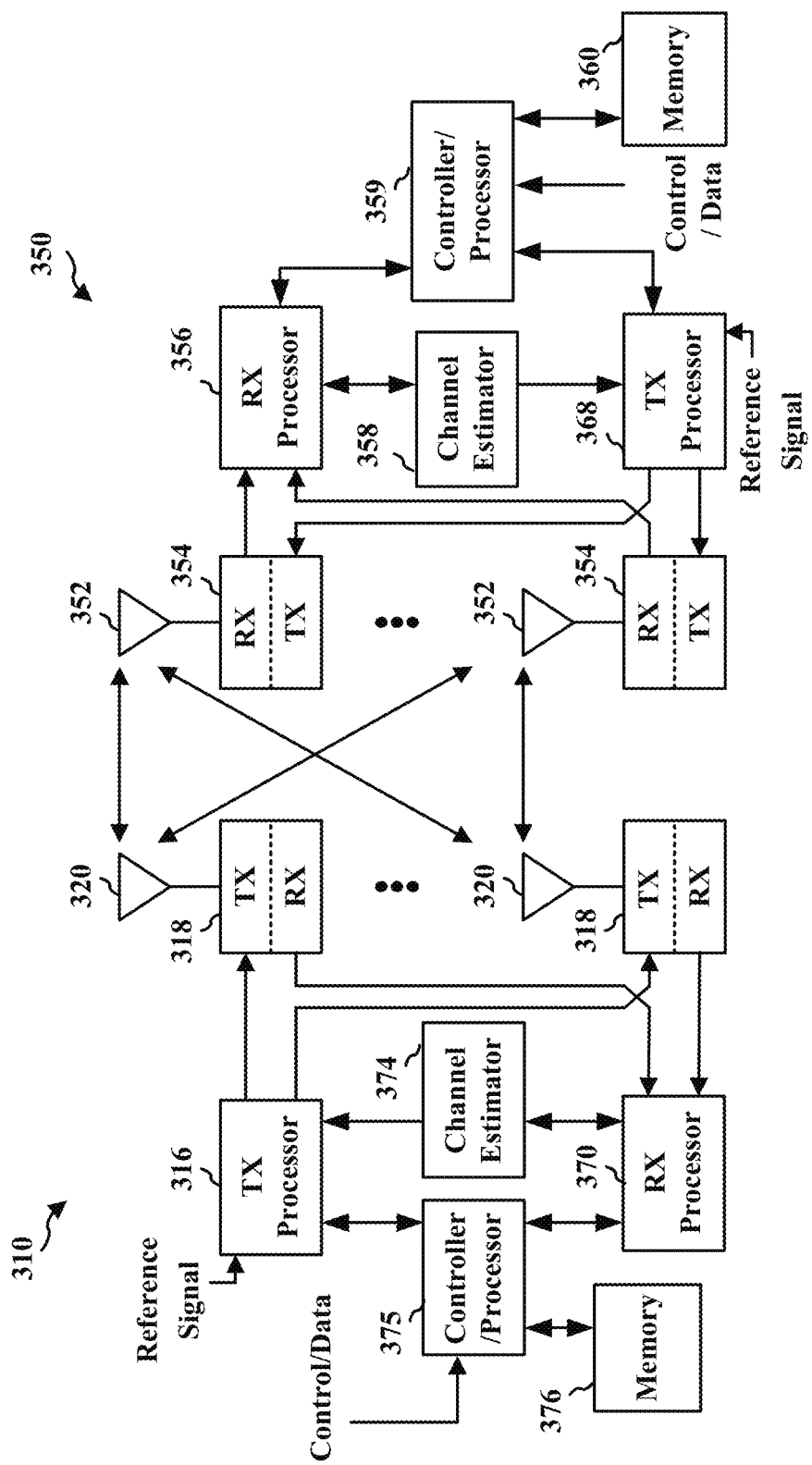
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
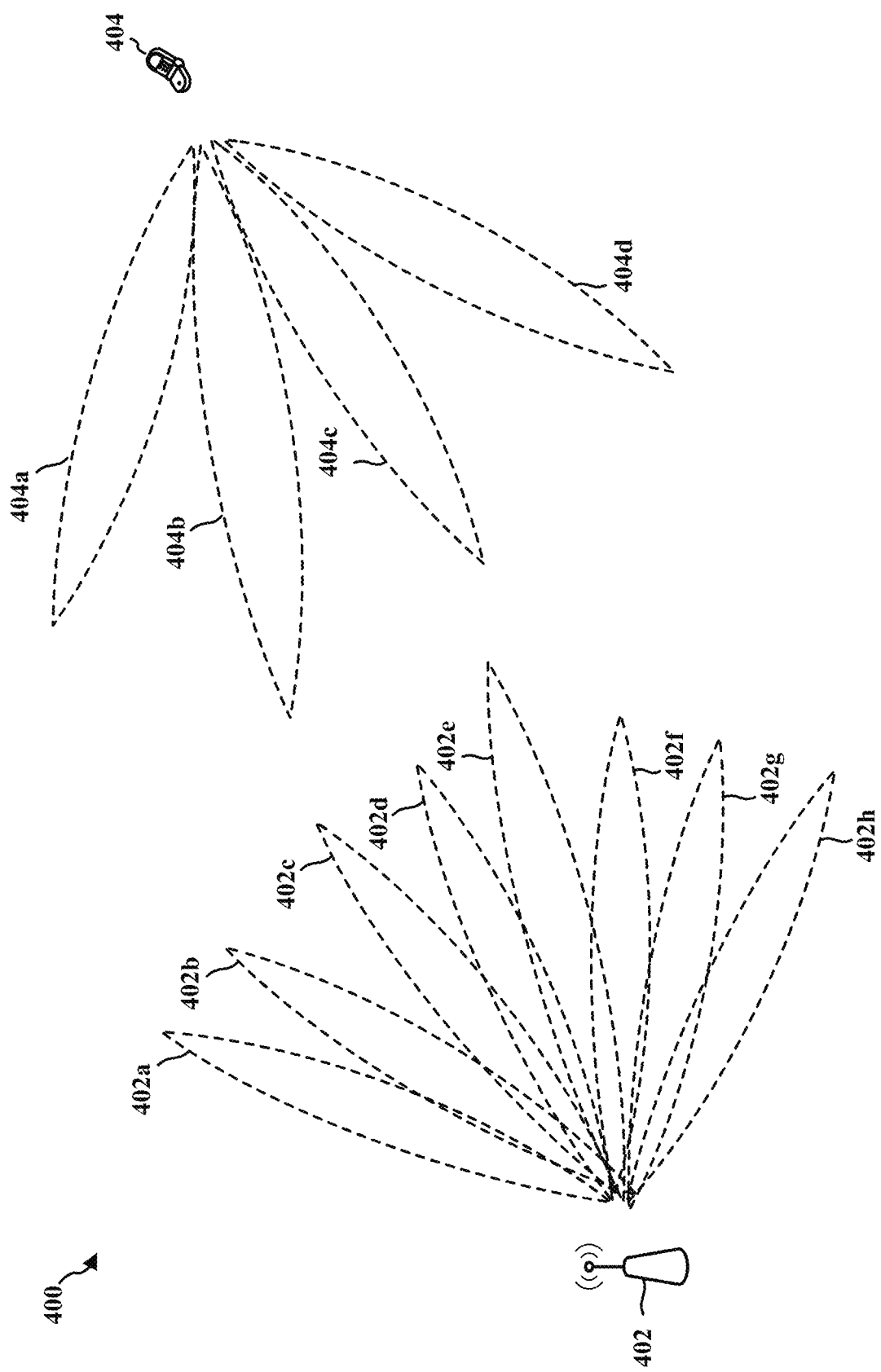
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In wireless communications, information may be represented as a sequence of binary bits. The information is then mapped, modulated and transported in communication channels, which introduce noise and data loss. Consequently, efficient coding algorithms (e.g., convolutional codes, TC, TBCC, LPDC, URLLC, polar codes, etc.) that may be used for error correction by the receiver device have been developed.

A UE may be configured with multiple coding algorithms or codes for error correction, e.g., for different RATs. Because there are a variety of codes (e.g., channel codes) specified for shared channels, enabling a UE to decode multiple types of codes may be useful. Additional types of channel codes may also be developed as RATs evolve and more technologies are produced. While there is some overlap in codes for certain RATs, many RATs employ a different channel coding scheme (e.g., convolutional coding scheme).

For example, a TC may be used for LTE, a TBCC may be used for NB-IoT, and a LDPC may be used for 5G NR. A base station may determine which type of code to use to encode data packets sent to the UE, and the determination may be based on UE complexity and/or cost. For instance, for NB-IoT, many NB devices may be low in complexity, so encoding data packets with a high performance code (e.g., TC) may not be feasible. Unfortunately, for a UE that supports decoding multiple types of convolutional codes, the inability to switch between coding algorithms deprives the UE of achieving a maximum decoding capability. Therefore, limiting a UE to a common coding scheme may limit UE performance.

To overcome the foregoing challenges and other issues, aspects of the present disclosure are directed to providing support for multiple channel codes, e.g., as described below in connection with any of FIGS. 5A-14.

FIGS. 5A-5D illustrates a data flow 500 that may be used by a UE 502 and a base station 504 to support the use of different channel codes for different sets of resources in accordance with certain aspects of the disclosure. UE 502 may correspond to, e.g., UE 104, 350, 1350, the apparatus 702/702', 1002/1002'. Base station 504 may correspond to, e.g., base station 102, 180, 310, 750, 1050, apparatus 1302/1302'. In addition, the base station 504 may be configured to encode resources using one of a plurality of channel codes (e.g., TC, TBCC, LDPC, URLLC, polar code, etc.), and the UE 502 may be configured to decode resources using one of a plurality of channel codes (e.g., TC, TBCC, LDPC, URLLC, polar code, etc.). In FIGS. 5A-5D, optional operations are indicated with dashed lines.

Figure 5A:
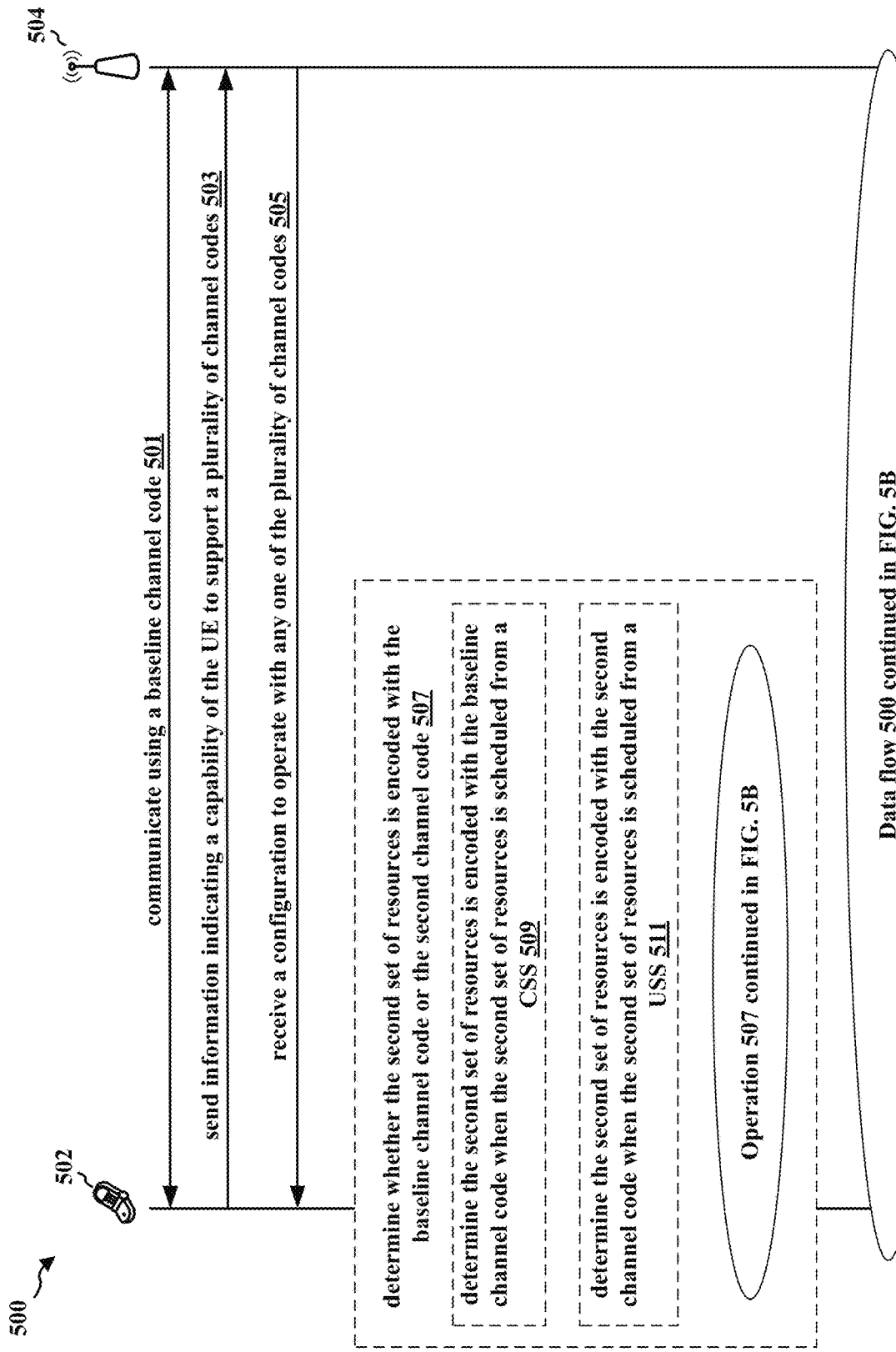

Referring to FIG. 5A, the UE 502 may establish (at 501) communication with a network via base station 504. During initial access, the UE 502 may access the network using a baseline code for a shared channel. The baseline code may, for example, include one of TC, TBCC, LDPC, or a polar code depending on which type of RAT is used for communications (at 501) between the UE 502 and the base station 504. In certain implementations, the base station 504 may send information to the UE 502 indicating that the base station 504 supports multiple channel codes. In certain other implementations, the base station 504 may not send information to the UE 502 indicating that the base station 504 supports multiple channel codes.

The UE 502 may send (at 503) information to the base station 504 indicating the capability to support multiple channel codes. That is, the UE 502 may explicitly or implicitly provide an indication that it supports one or more additional codes in addition to the baseline code. When an explicit indication of the supported channel codes is provided, the UE 502 may send a message that includes a bitmap indicating which from a list of possible channel codes are supported by the UE 502. When an implicit indication of the supported channel codes is provided, the UE 502 may send a message indicating which RAT(s) the UE 502 supports and/or the UE's 502 class, and hence, which channel codes are also supported by the UE 502.

In certain configurations, the base station 504 may select a second channel code from the plurality of channel codes that are supported by the UE 502 based at least in part on the information sent (at 503) by the UE 502. For example, the base station 504 may select the channel code that provides one or more of the lowest error rate, the smallest amount of processing time, the smallest amount of battery power used for decoding, the channel code associated with a particular RAT the UE 502 is currently using, etc.

The UE 502 may receive (at 505) a configuration to operate with any one of the plurality of channel codes from the base station 504. For example, the configuration may be conveyed by the base station 504 using, e.g., a common search space (CSS), a UE specific search space (USS), downlink control information (DCI), a modulation and coding scheme (MCS), a transport block size (TBS), a number of physical resource blocks (PRBs), and/or a number of repeated transmissions, just to name a few.

Based at least in part on the configuration sent (at 505) by the base station 504, the UE 502 may determine (at 507) whether the second set of resources is encoded with the baseline channel code or the second channel code.

In a first implementation, the UE 502 may determine (at 507) whether the second set of resources is encoded with the baseline channel code or the second channel code by determining (at 509) the second set of resources is encoded with the baseline channel code when the second set of resources is scheduled from a CSS. Additionally and/or alternatively, the UE 502 may determine (at 507) whether the second set of resources is encoded with the baseline channel code or the second channel code by determining (at 511) the second set of resources is encoded with the second channel code when the second set of resources is scheduled from a USS.

Usually the information received in a CSS may be received by multiple UEs, or may be common for a single UE after reconfiguration. In this sense, the shared channels scheduled from a CSS may use a baseline channel code (e.g., TBCC), and the shared channels scheduled from a USS may use an enhanced channel code (e.g., TC).

For the cases where one candidate can belong to USS or CSS because of overlapping search spaces, it is fixed in the specification which one the UE shall assume (e.g. assume USS).

Figure 5B:
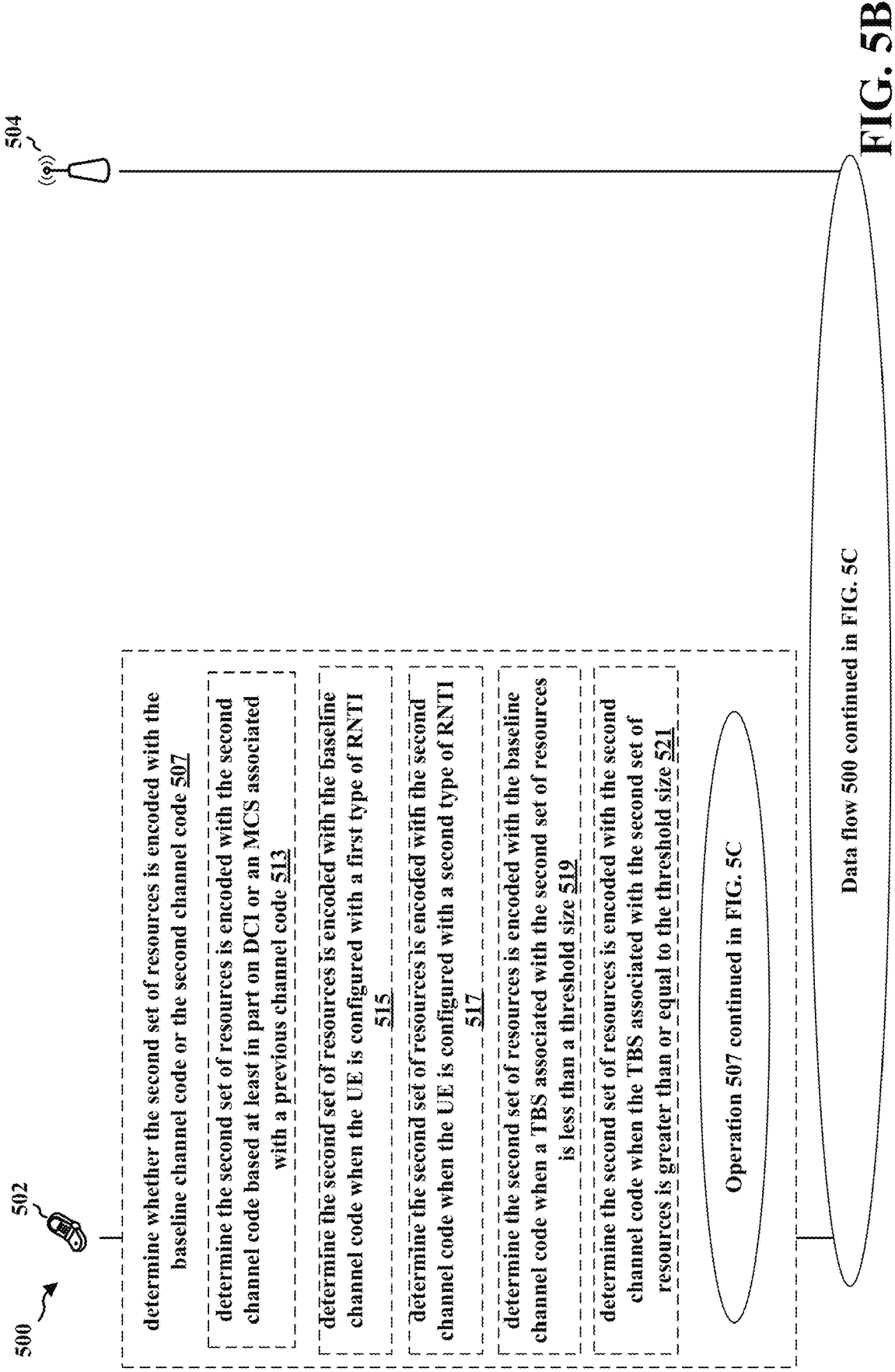

Referring to FIG. 5B, in a second implementation, the UE 502 may determine (at 507) whether the second set of resources is encoded with the baseline channel code or the second channel code by determining (at 513) the second set of resources is encoded with the second channel code based at least in part on DCI or a MCS associated with a previous channel code.

DCI may indicate the channel code to be used for the corresponding shared channel, e.g., by the inclusion of a bit field in DCI that selects among the plurality of coding schemes. The UE's 502 configured MCS may be used to implicitly imply which of the plurality of coding schemes is used for the second set of resources. For example, if the UE 502 is configured to receive the second set of resources using one of MCS 0-5, the UE 502 may determine that the second channel code is TBCC. When the UE 502 is configured to receive the second set of resources using one of MCS 6-11, the UE 502 may determine that the second channel code is an enhanced channel code, e.g., such as TC.

In certain aspects, the second implementation may can be combined with the first implementation in the sense that the fields in the DCI may be only present on the USS, or may be interpreted differently depending on whether the DCI is received in CSS or USS.

In a third implementation, the UE 502 may determine (at 507) whether the second set of resources is encoded with the baseline channel code or the second channel code by determining (at 515) the second set of resources is encoded with the baseline channel code when the UE is configured with a first type of radio network temporary identifier (RNTI), and by determining (at 517) the second set of resources is encoded with the second channel code when the UE is configured with a second type of RNTI. For example, when the UE 502 receives one or more messages intended for a first set of RNTI types (e.g., RA-RNTI, P-RNTI, TPC-RNTI, or SI-RNTI) the UE 502 may determine (at 515) to use a baseline code (e.g., TBCC) to decode the second set of resources. Conversely, when the UE 502 receives one or more messages intended for a second set of RNTI types (e.g., C-RNTI), the UE 502 may determine (at 517) to use an enhanced code (e.g., TC) to decode the second set of resources.

In a fourth implementation, the UE 502 may determine (at 507) whether the second set of resources is encoded with the baseline channel code or the second channel code by determining (at 519) the second set of resources is encoded with the baseline channel code when a TBS associated with the second set of resources is less than a threshold size, and determining (at 521) the second set of resources is encoded with the second channel code when the TBS associated with the second set of resources is greater than or equal to the threshold size.

For example, when the second set of resources includes a TBS size that is less than a threshold size (e.g., 100 bits, 1000 bits, 10000 bits, etc.), the UE 502 may determine (at 519) that the baseline channel code may be used to decode the second set of resources. Additionally and/or alternatively, when the second set of resources includes a TBS size that is greater than or equal to the threshold size (e.g., 100 bits, 1000 bits, 10000 bits, etc.), the UE 502 may determine (at 521) that the second set of resources is encoded with the second channel code.

Referring to FIG. 5C, in a fifth implementation, the UE 502 may determine (at 507) whether the second set of resources is encoded with the baseline channel code or the second channel code by determining (at 523) the second set of resources is encoded with the baseline channel code when a resource assignment associated with the second set of resources is less than a threshold number of physical resource blocks (PRBs). The UE 502 may determine (at 507) whether the second set of resources is encoded with the baseline channel code or the second channel code by determining (at 525) the second set of resources is encoded with the second channel code when the resource assignment associated with the second set of resources is greater than or equal to the threshold number of PRBs.

For example, when the resource assignment associated with the second set of resources includes less than a threshold number of PRBs (e.g., 2 PRBs, 6 PRBs, etc.), the UE 502 may determine (at 523) that the second set of resources is encoded with the baseline channel code. Otherwise, when the resource assignment associated with the second set of resources includes greater than or equal to the threshold number of PRBs, the UE 502 may determine (at 525) that the second set of resources is encoded with the second channel code.

In a sixth implementation, the UE 502 may determine (at 507) whether the second set of resources is encoded with the baseline channel code or the second channel code by determining (at 527) the second set of resources is encoded with the baseline channel code when a number of repetitions sent using the second set of resources is less than a threshold number of repetitions. Additionally and/or alternatively, the UE 502 may determine (at 507) whether the second set of resources is encoded with the baseline channel code or the second channel code by determining (at 529) the second set of resources is encoded with the second channel code when the number of repetitions sent using the second set of resources is greater than or equal to the threshold number of repetitions.

For example, when the number of repetitions sent using the second set of resources includes less than a threshold number of repetitions (e.g., 2 repetitions, 5 repetitions, 10 repetitions, 50 repetitions, etc.), the UE 502 may determine (at 527) that the second set of resources is encoded with the baseline channel code. Otherwise, when the number of repetitions sent using the second set of resources includes greater than or equal to the threshold number of repetitions, the UE 502 may determine (at 529) that the second set of resources is encoded with the second channel code. The number of repetitions sent using the second set of resources may include the number of repetitions semi-statically configured by the Radio Resource Control (RRC) or the actual number of repetitions (e.g., dynamically indicated in the DCI), for example.

The UE 502 may receive (at 531) a first set of resources and a second set of resources from the base station 504. In certain aspects, the first set of resources may be encoded with the baseline channel code and the second set of resources may be encoded with one of the baseline code or a second channel code of the one or more second channel codes.

Referring to FIG. 5D, the UE 502 may decode (at 533) the first set of resources using the baseline channel code and the second set of resources using the baseline channel code or the second channel code depending on the outcome of at least one of the implementations described above in connection with operations 507-529.

In certain configurations, the UE 502 may send (at 535) additional information to the base station 504 indicating a preferred channel code for the CSI feedback. In some aspects, when the UE 502 supports multiple channel codes, CSI feedback may be encoded with one of channel codes (e.g., a reference channel code) prior to transmission to the base station 504.

In certain other configurations, when the UE 502 is configured with an enhanced code such as TC, the UE 502 may use the enhanced code as the reference for CSI feedback. In another example, the reference code may be based on an entry in the CQI table. That is, each of the entries in the CQI table may be associated with a given channel code. In a further example, the base station may configure the UE 502 with a reference code to be used for CSI feedback (e.g., during RRC configuration).

The base station 504 may transmit (at 537) a second configuration instructing the UE 502 to operate with any one of the plurality of channel codes as a reference code for CSI feedback. In certain configurations, the second configuration may be for the preferred channel code indicated by the UE 502 in operation 535. Based on the second configuration, the UE 502 may encode (at 539) CSI feedback prior to transmission (at 541) to the base station 504.

In certain implementations, the UE 502 may receive (at 543), from the base station 504, a third configuration to operate with one of the plurality of channel codes for UL communication(s) and another one of the plurality of channel codes for DL communication(s). Upon receiving (at 545) a DL communication from the base station 504, the UE 502 may decode (at 547) the DL communication using the channel code indicated in the third configuration for DL communication(s). The UE 502 may encode (at 549) a UL communication prior to transmission (at 551) to the base station 504. The base station 504 may decode the UL transmission based on the channel code indicated in the third configuration.

Using the technique(s) described above in connection with FIGS. 5A-5D, the UE 502 of the present disclosure may be enabled to switch between multiple types of channel codes (e.g., convolutional codes) for encoding and/or decoding data transmissions in order to increase the UE's 502 decoding capability.

Figure 5E:
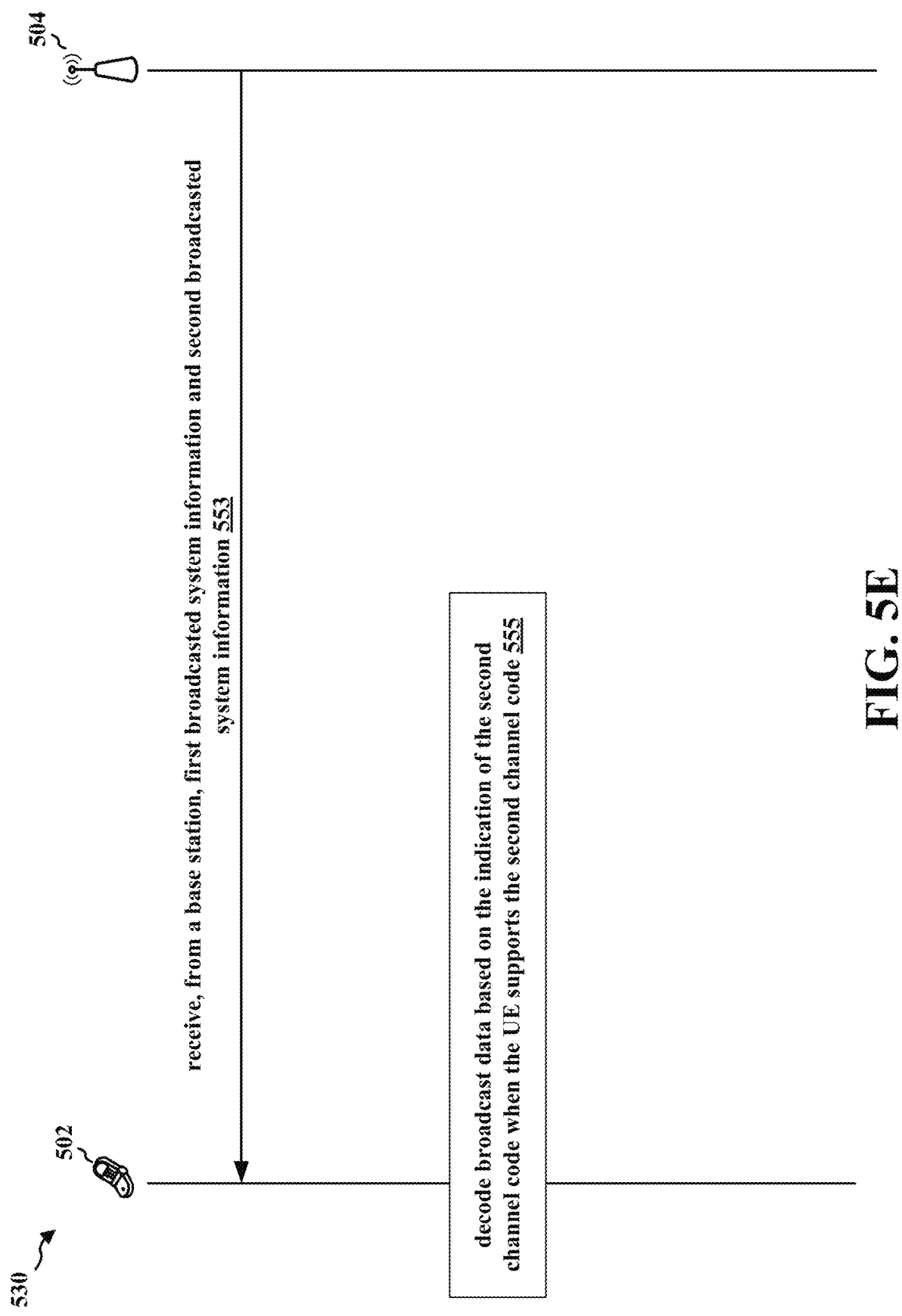
FIG. 5E illustrates a data flow between a UE and a base station in accordance with aspects of the present disclosure.

FIG. 5E is a data flow 530 that may be used by a UE 502 and a base station 504 to support the use of different channel codes for different sets of resources in accordance with certain aspects of the disclosure. UE 502 may correspond to, e.g., UE 104, 350, 1350, the apparatus 702/702', 1002/1002'. Base station 504 may correspond to, e.g., base station 102, 180, 310, 750, 1050, apparatus 1302/1302'. In addition, the base station 504 may be configured to encode resources using one of a plurality of channel codes (e.g., TC, TBCC, LDPC, URLLC, polar code, etc.), and the UE 502 may be configured to decode resources using one of a plurality of channel codes (e.g., TC, TBCC, LDPC, URLLC, polar code, etc.).

In certain configurations, the UE 502 may receive (at 553), from a base station, first broadcasted system information and second broadcasted system information. In certain aspects, the first broadcasted system information may be encoded with a first channel code. In certain other aspects, the first broadcasted system information may include an indication that the second broadcasted system information is encoded with the second channel code.

For broadcast services based on shared channel, such as a single cell point to multipoint (SC-PTM) or a physical multicast channel (PMCH), the base station 504 may determine to send the broadcast services based on a first channel code or a second channel code. The information indicating which channel code to use may be broadcast in system information or the multicast logical channel (e.g., single cell-multimedia broadcast multicast service control channel (SC-MCCH)). The channel code indication can be interpreted as the configuration received (at 505) in FIG. 5A, in which case the UE 502 may determine the code based on one or more of operations 507-529 described above in connection with any of FIGS. 5A-5C.

For SC-PTM, the base station 504 may have different UE groupings based on the supported channel codes. For example, the base station 504 may group a first set of UEs that each support TC or LDPC, and hence, broadcast data for the first set of UEs may be encoded with TC or LDPC. The base station 504 may group a second set of UEs that each support another channel code, such as URLLC. In this example, broadcast data for the second set of UEs may be encoded with URLLC.

In other words, UE 502 is not required to receive a given MBMS/SC-PTM service if the UE 502 does not support the corresponding channel code that encodes the broadcast service. However, when the UE 502 supports the second channel code, the UE 502 may decode (at 555) broadcast data (e.g., MBMS/SC-PTM service).

Figure 6A:
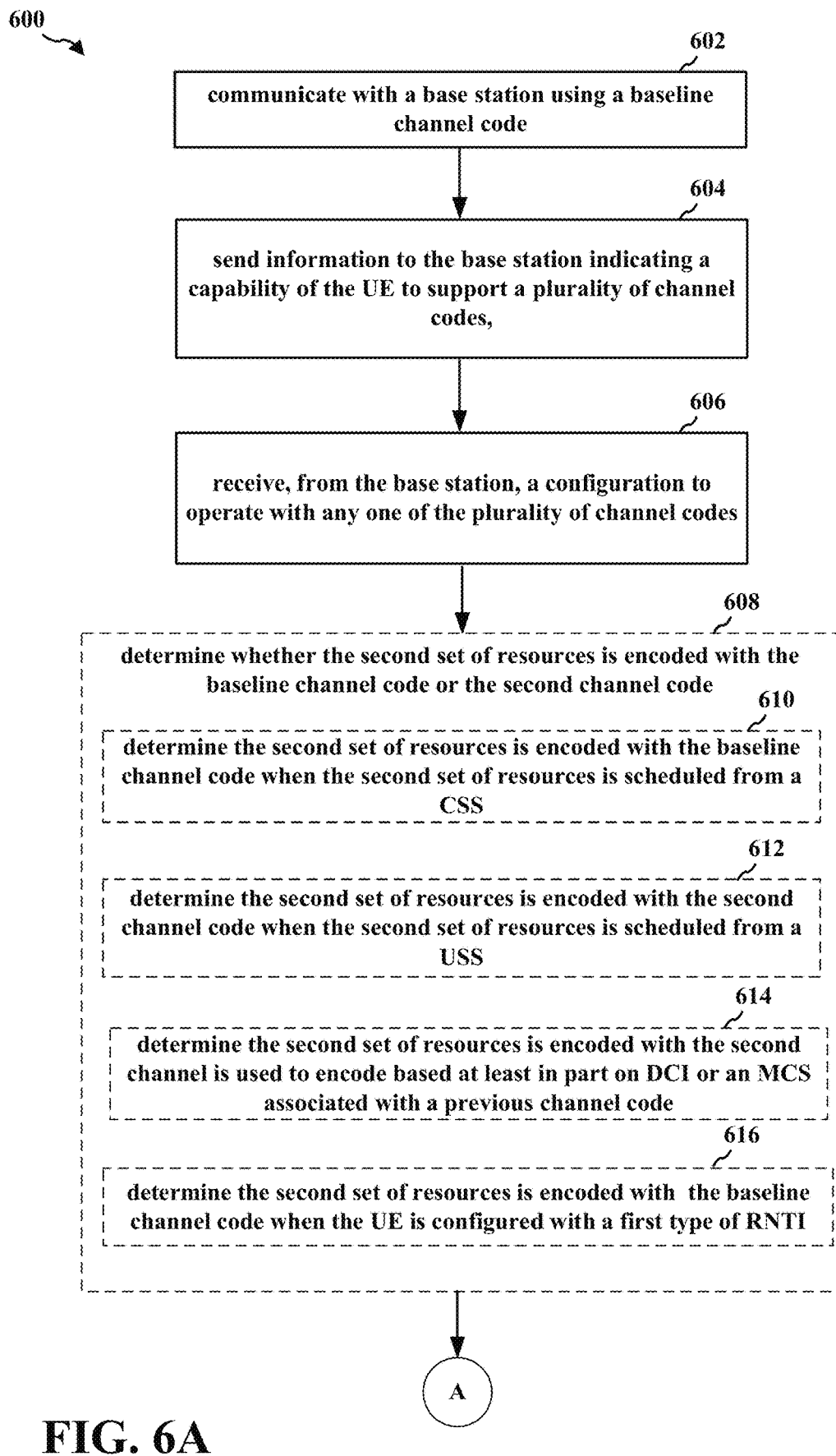
FIGS. 6A-6C are a flowchart illustrating methods of wireless communication in accordance with aspect of the present disclosure.
Figure 6B:
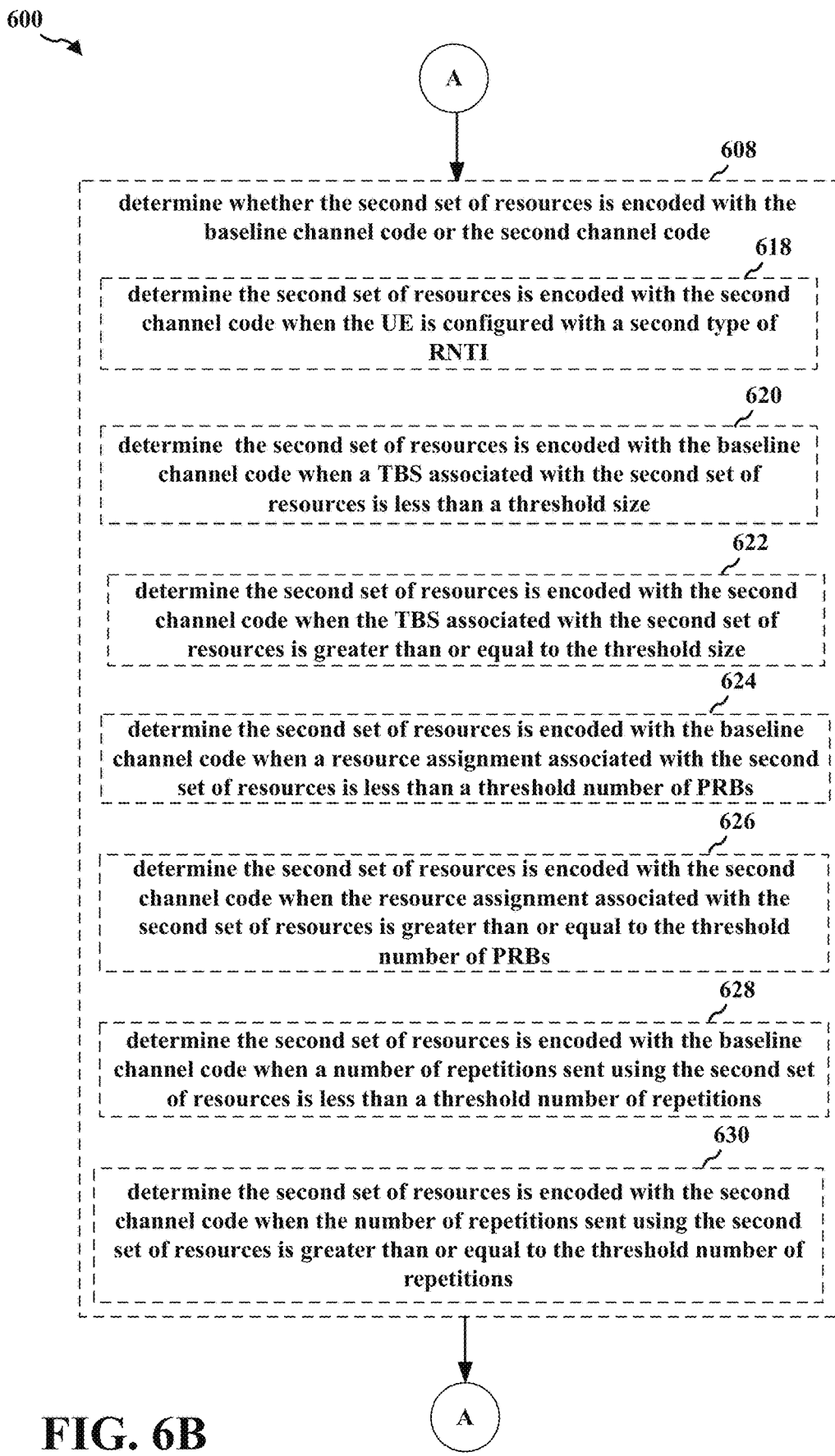
Figure 6C:
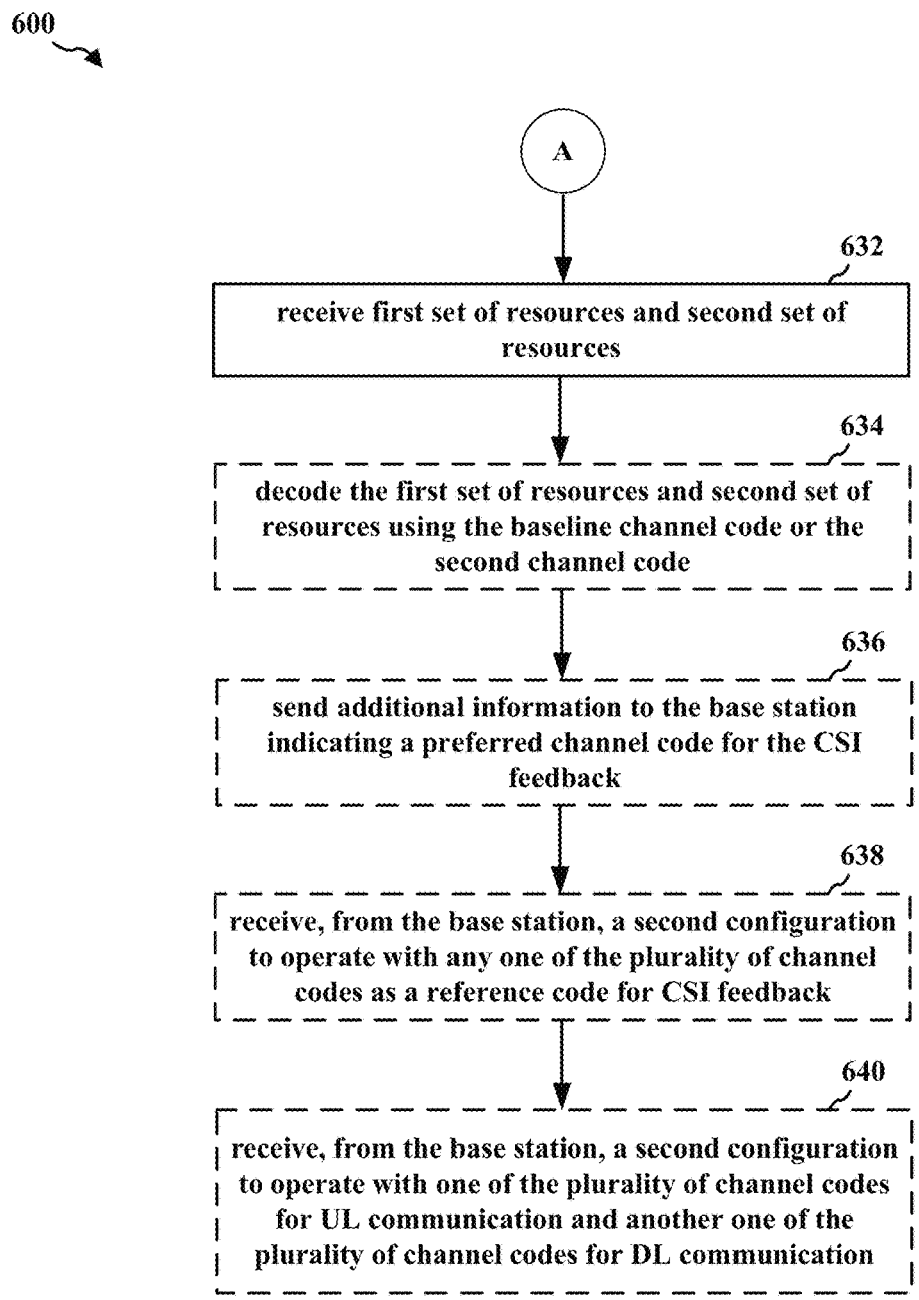

FIGS. 6A-6C are a flowchart 600 of a method of wireless communication. The method may be performed by a UE (e.g., UE 104, 350, 502, 1350, the apparatus 702/702', 1002/1002'). In FIGS. 6A-6C, optional operations are indicated with dashed lines.

Referring to FIG. 6A, at 602, the UE may communicate with a base station using a baseline channel code. For example, referring to FIG. 5A, the UE 502 may establish (at 501) communication with a network via base station 504. During initial access, the UE 502 may access the network using a baseline code for a shared channel. The baseline code may, for example, include one of TC, TBCC, LDPC, or a polar code depending on which type of RAT is used for communications (at 501) between the UE 502 and the base station 504.

At 604, the UE may send information to the base station indicating a capability of the UE to support a plurality of channel codes. In certain aspects, the plurality of channel codes may include the baseline channel code and one or more second channel codes. In certain other aspects, the baseline channel code may include one of TC, TBCC, a LDPC, URLLC, or a polar code. In certain other aspects, the information may be sent to the base station using the baseline channel code. For example, referring to FIG. 5A, UE 502 may send (at 503) information to the base station 504 indicating the capability to support multiple channel codes. That is, the UE 502 may explicitly or implicitly provide an indication that it supports one or more additional codes addition to the baseline code. When an explicit indication of the supported channel codes is provided, the UE 502 may send a message that includes a bitmap indicating which from a list of possible channel codes are supported by the UE 502. When an implicit indicate of the supported channel codes is provided, the UE 502 may send a message indicating which RAT(s) the UE 502 supports, and hence, which channel codes are also supported by the UE 502.

At 606, the UE may receive, from the base station, a configuration to operate with any one of the plurality of channel codes. For example, referring to FIG. 5A, the UE 502 may receive (at 505) a configuration to operate with any one of the plurality of channel codes from the base station 504. For example, the configuration may be conveyed by the base station 504 using, e.g., a CSS, a USS, DCI, a MCS, a TBS, a number of PRBs, and/or a number of repeated transmissions, just to name a few.

At 608, the UE may determine whether the second set of resources is encoded with the baseline channel code or the second channel code based at least in part on the configuration received from the base station. For example, referring to FIG. 5A, based at least in part on the configuration sent (at 505) by the base station 504, the UE 502 may determine (at 507) whether the second set of resources is encoded with the baseline channel code or the second channel code.

At 610, the UE may determine whether the second set of resources is encoded with the baseline channel code or the second channel code by determining the second set of resources is encoded with the baseline channel code when the second set of resources is scheduled from a CSS. For example, referring to FIG. 5A, the UE 502 may determine (at 507) whether the second set of resources is encoded with the baseline channel code or the second channel code by determining (at 509) the second set of resources is encoded with the baseline channel code when the second set of resources is scheduled from a CSS. The information received in a CSS may be received by multiple UEs, or may be common for a single UE after reconfiguration. In this sense, the shared channels scheduled from a CSS may use a baseline channel code (e.g., TBCC).

At 612, the UE may determine whether the second set of resources is encoded with the baseline channel code or the second channel code by determining the second set of resources is encoded with the second channel code when the second set of resources is scheduled from a USS. For example, referring to FIG. 5A, the UE 502 may determine (at 507) whether the second set of resources is encoded with the baseline channel code or the second channel code by determining (at 511) the second set of resources is encoded with the second channel code when the second set of resources is scheduled from a USS. The shared channels scheduled from a USS may use an enhanced channel code (e.g., TC).

At 614, the UE may determine whether the second set of resources is encoded with the baseline channel code or the second channel code by determining the second set of resources is encoded with the second channel code based at least in part on DCI or an MCS associated with a previous channel code. For example, referring to FIG. 5B, the UE 502 may determine (at 507) whether the second set of resources is encoded with the baseline channel code or the second channel code by determining (at 513) the second set of resources is encoded with the second channel code based at least in part on DCI or a MCS associated with a previous channel code. DCI may indicate the channel code to be used for the corresponding shared channel, e.g., by the inclusion of a bit field in DCI that selects among the plurality of coding schemes. The UE's 502 configured MCS may be used to implicitly imply which of the plurality of coding schemes is used for the second set of resources. For example, if the UE 502 is configured to receive the second set of resources using one of MCS 0-5, the UE 502 may determine that the second channel code is TBCC. When the UE 502 is configured to receive the second set of resources using one of MCS 6-11, the UE 502 may determine that the second channel code is an enhanced channel code, e.g., such as TC.

At 616, the UE may determine whether the second set of resources is encoded with the baseline channel code or the second channel code by determining the second set of resources is encoded with the baseline channel code when the UE is configured with a first type of RNTI. For example, referring to FIG. 5B, the UE 502 may determine (at 507) whether the second set of resources is encoded with the baseline channel code or the second channel code by determining (at 515) the second set of resources is encoded with the baseline channel code when the UE is configured with a first type of RNTI. For example, when the UE 502 receives one or more messages intended for a first set of RNTI types (e.g., RA-RNTI, P-RNTI, TPC-RNTI, or SI-RNTI) the UE 502 may determine (at 515) to use a baseline code (e.g., TBCC) to decode the second set of resources.

Referring to FIG. 6B, at 618, the UE may determine whether the second set of resources is encoded with the baseline channel code or the second channel code by determining the second set of resources is encoded with the second channel code when the UE is configured with a second type of RNTI. For example, referring to FIG. 5B, the UE 502 may determine (at 507) whether the second set of resources is encoded with the baseline channel code or the second channel code by determining (at 517) the second set of resources is encoded with the second channel code when the UE is configured with a second type of RNTI. For example, when the UE 502 receives one or more messages intended for a second set of RNTI types (e.g., C-RNTI), the UE 502 may determine (at 517) to use an enhanced code (e.g., TC) to decode the second set of resources.

At 620, the UE may determine whether the second set of resources is encoded with the baseline channel code or the second channel code by determining the second set of resources is encoded with the baseline channel code when a TBS associated with the second set of resources is less than a threshold size. For example, referring to FIG. 5B, the UE 502 may determine (at 507) whether the second set of resources is encoded with the baseline channel code or the second channel code by determining (at 519) the second set of resources is encoded with the baseline channel code when a TBS associated with the second set of resources is less than a threshold size. For example, when the second set of resources includes a TBS size that is less than a threshold size (e.g., 100 bits, 1000 bits, 10000 bits, etc.), the UE 502 may determine (at 519) that the baseline channel code may be used to decode the second set of resources.

At 622, the UE may determine whether the second set of resources is encoded with the baseline channel code or the second channel code by determining the second set of resources is encoded with the second channel code when the TBS associated with the second set of resources is greater than or equal to the threshold size. For example, referring to FIG. 5B, the UE 502 may determine (at 507) whether the second set of resources is encoded with the baseline channel code or the second channel code by determining (at 521) the second set of resources is encoded with the second channel code when the TBS associated with the second set of resources is greater than or equal to the threshold size. For example, when the second set of resources includes a TBS size that is greater than or equal to the threshold size (e.g., 100 bits, 1000 bits, 10000 bits, etc.), the UE 502 may determine (at 521) that the second set of resources is encoded with the second channel code.

At 624, the UE may determine whether the second set of resources is encoded with the baseline channel code or the second channel code by determining the second set of resources is encoded with the baseline channel code when a resource assignment associated with the second set of resources is less than a threshold number of PRBs. For example, referring to FIG. 5C, the UE 502 may determine (at 507) whether the second set of resources is encoded with the baseline channel code or the second channel code by determining (at 523) the second set of resources is encoded with the baseline channel code when a resource assignment associated with the second set of resources is less than a threshold number of PRBs. For example, when the resource assignment associated with the second set of resources includes less than a threshold number of PRBs (e.g., 2 PRBs, 6 PRBs, etc.), the UE 502 may determine (at 523) that the second set of resources is encoded with the baseline channel code.

At 626, the UE may determine whether the second set of resources is encoded with the baseline channel code or the second channel code by determining the second set of resources is encoded with the second channel code when the resource assignment associated with the second set of resources is greater than or equal to the threshold number of PRBs. For example, referring to FIG. 5C, the UE 502 may determine (at 507) whether the second set of resources is encoded with the baseline channel code or the second channel code by determining (at 525) the second set of resources is encoded with the second channel code when the resource assignment associated with the second set of resources is greater than or equal to the threshold number of PRBs. For example, the resource assignment associated with the second set of resources includes greater than or equal to the threshold number of PRBs (e.g., 2 PRBs, 6 PRBs, etc.), the UE 502 may determine (at 525) that the second set of resources is encoded with the second channel code.

At 628, the UE may determine whether the second set of resources is encoded with the baseline channel code or the second channel code by determining the second set of resources is encoded with the baseline channel code when a number of repetitions sent using the second set of resources is less than a threshold number of repetitions. For example, referring to FIG. 5C, the UE 502 may determine (at 507) whether the second set of resources is encoded with the baseline channel code or the second channel code by determining (at 527) the second set of resources is encoded with the baseline channel code when a number of repetitions sent using the second set of resources is less than a threshold number of repetitions. For example, when the number of repetitions sent using the second set of resources includes less than a threshold number of repetitions (e.g., 2 repetitions, 5 repetitions, 10 repetitions, 50 repetitions, etc.), the UE 502 may determine (at 527) that the second set of resources is encoded with the baseline channel code.

At 630, the UE may determine whether the second set of resources is encoded with the baseline channel code or the second channel code by determining the second set of resources is encoded with the second channel code when the number of repetitions sent using the second set of resources is greater than or equal to the threshold number of repetitions. For example, referring to FIG. 5C, the UE 502 may determine (at 507) whether the second set of resources is encoded with the baseline channel code or the second channel code by determining (at 529) the second set of resources is encoded with the second channel code when the number of repetitions sent using the second set of resources is greater than or equal to the threshold number of repetitions. Otherwise, when the number of repetitions sent using the second set of resources includes greater than or equal to the threshold number of repetitions, the UE 502 may determine (at 529) that the second set of resources is encoded with the second channel code. The number of repetitions sent using the second set of resources may include the number of repetitions semi-statically configured by the RRC or the actual number of repetitions (e.g., dynamically indicated in the DCI), for example.

Referring to FIG. 6C, at 632, the UE may receive a first set of resources and a second set of resources from the base station. In certain aspects, the first set of resources may be encoded with the baseline channel code and the second set of resources may be encoded with one of the baseline channel code or a second channel code of the one or more second channel codes. In certain other aspects, the second channel code includes one of TC, TBCC, LDPC, URLLC, or a polar code. In certain other aspects, the second set of resources may include one or more shared channel assignments encoded with the second channel code. In certain other aspects, the second channel code includes an enhanced channel code and the enhanced channel code is a reference code for CSI feedback. In certain other aspects, the first set of resources and the second set of resources may be received in a same subframe. In certain other aspects, the first set of resources may be received in a first set of code blocks and the second set of resources are received in a second set of code blocks in the same subframe. In certain other aspects, the first set of code blocks and the second set of code blocks may be included in a same transport block. For example, referring to FIG. 5C, the UE 502 may receive (at 531) a first set of resources and a second set of resources from the base station 504.

At 634, the UE may decode the first set of resources and second set of resources using the baseline channel code and/or the second channel code. For example, referring to FIG. 5D, the UE 502 may decode (at 533) the first set of resources using the baseline channel code and the second set of resources using the baseline channel code or the second channel code depending on the outcome of at least one of the implementations described above in connection with operations 507-529.

At 636, the UE may send additional information to the base station indicating a preferred channel code for the CSI feedback. For example, referring to FIG. 5D, the UE 502 may send (at 535) additional information to the base station 504 indicating a preferred channel code for the CSI feedback. In some aspects, when the UE 502 supports multiple channel codes, CSI feedback may be encoded with one of channel codes (e.g., a reference channel code) prior to transmission to the base station 504.

At 638, the UE may receive, from the base station, a second configuration to operate with any one of the plurality of channel codes as a reference code for CSI feedback. For example, referring to FIG. 5D, the UE 502 may receive (at 537) a second configuration instructing the UE 502 to operate with any one of the plurality of channel codes as a reference code for CSI feedback. In certain configurations, the second configuration may be for the preferred channel code indicated by the UE 502 in operation 535. In certain other configurations, when the UE 502 is configured with an enhanced code such as TC, the UE 502 may use the enhanced code as the reference for CSI feedback. In another example, the reference code may be based on an entry in the CQI table. That is, each of the entries in the CQI table may be associated with a given channel code. In a further example, the base station may configure the UE 502 with a reference code to be used for CSI feedback (e.g., during RRC configuration).

At 640, the UE may receive, from the base station, a second configuration to operate with one of the plurality of channel codes for UL communication and another one of the plurality of channel codes for DL communication. For example, referring to FIG. 5D, the UE 502 may receive (at 543), from the base station 504, a third configuration to operate with one of the plurality of channel codes for UL communication(s) and another one of the plurality of channel codes for DL communication(s). Upon receiving (at 545) a DL communication from the base station 504, the UE 502 may decode (at 547) the DL communication using the channel code indicated in the third configuration for DL communication(s). The UE 502 may encode (at 549) a UL communication prior to transmission (at 551) to the base station 504.

Figure 7:
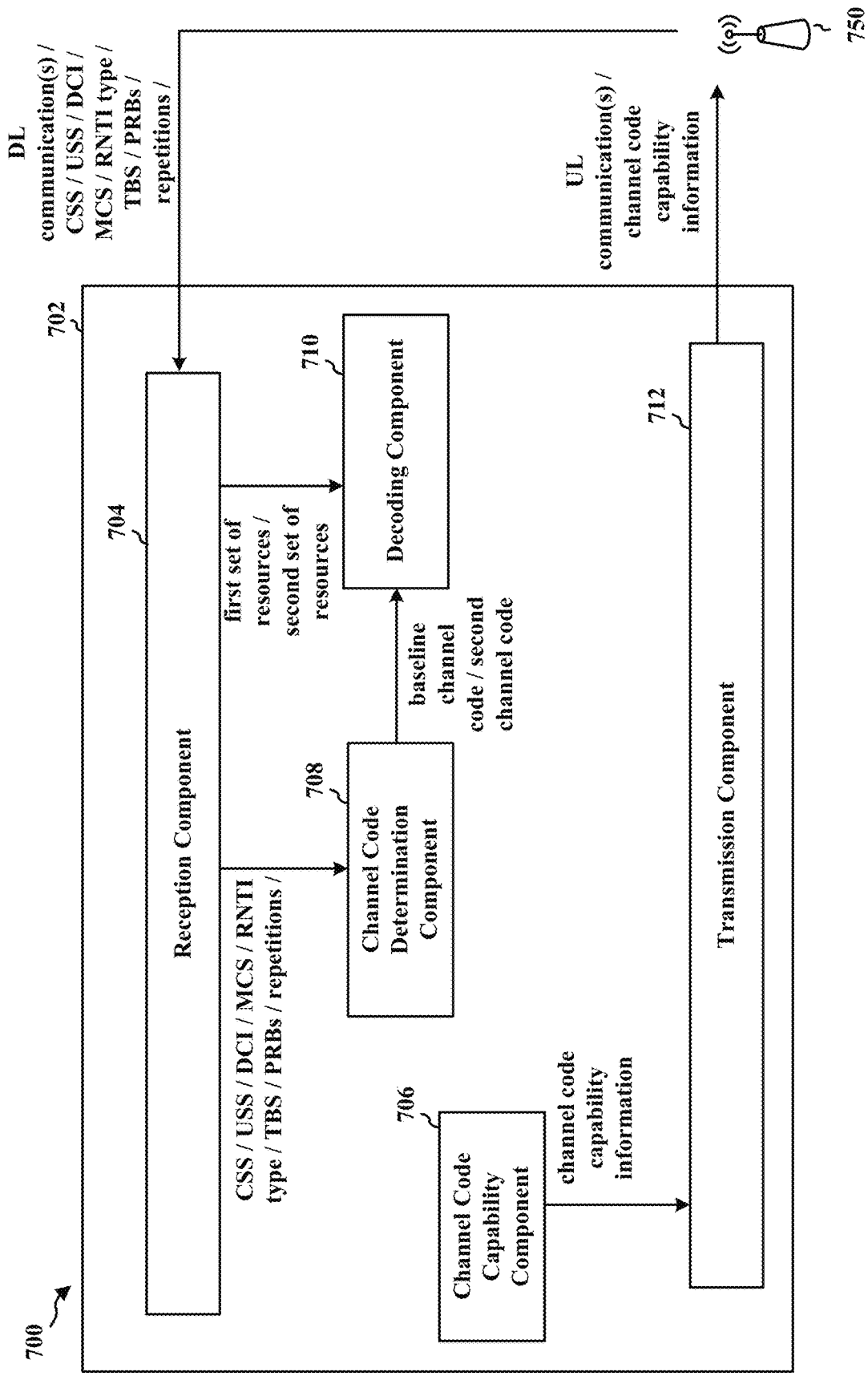
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., UE 104, 350, 502, 1350, the apparatus 702', 1002/1002') in communication with a base station 750 (e.g., base station 102, 180, 310, 1050, apparatus 1302/1302'). The apparatus includes a reception component 704, a channel code capability component 706, a channel code determination component 708, a decoding component 710, and a transmission component 712.

In certain configurations, one or more of the reception component 704 and/or the transmission component 712 may be configured to communicate with the base station 750 using a baseline channel code.

The channel code capability component 706 may be configured to maintain a list of channel codes supported by the UE and to generate information indicating a capability of the UE to support a plurality of channel codes. The information may be sent to the transmission component 712.

The transmission component 712 may be configured to send information to the base station indicating a capability of the UE to support a plurality of channel codes. In certain aspects, the plurality of channel codes may include the baseline channel code and one or more second channel codes. In certain other aspects, the baseline channel code may include one of TC, TBCC, a LDPC, URLLC, or a polar code. In certain other aspects, the information may be sent to the base station 750 using the baseline channel code.

The reception component 704 may be configured to receive, from the base station 750, a configuration to operate with any one of the plurality of channel codes. The configuration may be received in one or more of CSS, USS, DCI, MCS, RNTI type, TBS, PRBs, and/or transmission repetitions. The reception component 704 may be configured to send the configuration to the channel code determination component 708.

The channel code determination component 708 may be configured to determine whether the second set of resources is encoded with the baseline channel code or the second channel code based at least in part on the configuration received from the base station. In certain implementations, the channel code determination component 708 may be configured to determine whether the second set of resources is encoded with the baseline channel code or the second channel code by determining the second set of resources is encoded with the baseline channel code when the second set of resources is scheduled from a CSS. In certain other implementations, the channel code determination component 708 may be configured to determine whether the second set of resources is encoded with the baseline channel code or the second channel code by determining the second set of resources is encoded with the second channel code when the second set of resources is scheduled from a USS. In certain other implementations, the channel code determination component 708 may be configured to determine whether the second set of resources is encoded with the baseline channel code or the second channel code by determining the second set of resources is encoded with the second channel code based at least in part on DCI or an MCS associated with a previous channel code. In certain other implementations, the channel code determination component 708 may be configured to determine whether the second set of resources is encoded with the baseline channel code or the second channel code by determining the second set of resources is encoded with the baseline channel code when the UE is configured with a first type of RNTI. In certain other implementations, the channel code determination component 708 may be configured to determine whether the second set of resources is encoded with the baseline channel code or the second channel code by determining the second set of resources is encoded with the second channel code when the UE is configured with a second type of RNTI. In certain other implementations, the channel code determination component 708 may be configured to determine whether the second set of resources is encoded with the baseline channel code or the second channel code by determining the second set of resources is encoded with the baseline channel code when a TBS associated with the second set of resources is less than a threshold size. In certain other implementations, the channel code determination component 708 may be configured to determine whether the second set of resources is encoded with the baseline channel code or the second channel code by determining the second set of resources is encoded with the second channel code when the TBS associated with the second set of resources is greater than or equal to the threshold size. In certain other implementations, the channel code determination component 708 may be configured to determine whether the second set of resources is encoded with the baseline channel code or the second channel code by determining the second set of resources is encoded with the baseline channel code when a resource assignment associated with the second set of resources is less than a threshold number of PRBs. In certain other implementations, the channel code determination component 708 may be configured to determine whether the second set of resources is encoded with the baseline channel code or the second channel code by determining the second set of resources is encoded with the second channel code when the resource assignment associated with the second set of resources is greater than or equal to the threshold number of PRBs. In certain other implementations, the channel code determination component 708 may be configured to determine whether the second set of resources is encoded with the baseline channel code or the second channel code by determining the second set of resources is encoded with the baseline channel code when a number of repetitions sent using the second set of resources is less than a threshold number of repetitions. In certain other implementations, the channel code determination component 708 may be configured to determine whether the second set of resources is encoded with the baseline channel code or the second channel code by determining the second set of resources is encoded with the second channel code when the number of repetitions sent using the second set of resources is greater than or equal to the threshold number of repetitions. The channel code determination component 708 may be configured to send a signal indicated whether the baseline channel code or the second channel code is used to decode the second set of resources to the decoding component 710.

The reception component 704 may be configured to receive a first set of resources and a second set of resources from the base station. In certain aspects, the first set of resources may be encoded with the baseline channel code and the second set of resources may be encoded with one of the baseline channel code or a second channel code of the one or more second channel codes. In certain other aspects, the second channel code includes one of TC, TBCC, LDPC, URLLC, or a polar code. In certain other aspects, the second set of resources may include one or more shared channel assignments encoded with the second channel code. In certain other aspects, the second channel code includes an enhanced channel code and the enhanced channel code is a reference code for CSI feedback. In certain other aspects, the first set of resources and the second set of resources may be received in a same subframe. In certain other aspects, the first set of resources may be received in a first set of code blocks and the second set of resources are received in a second set of code blocks in the same subframe. In certain other aspects, the first set of code blocks and the second set of code blocks may be included in a same transport block.

The reception component 704 may be configured to send the first set of resources and the second set of resources to the decoding component 710.

The decoding component 710 may be configured to decode the first set of resources and second set of resources using the baseline channel code and/or the second channel code.

The channel code capability component 706 may be configured to generate additional information indicating a preferred channel code for the CSI feedback. The additional information may be sent to the transmission component 712.

The transmission component 712 may be configured to send additional information to the base station 750 indicating a preferred channel code for the CSI feedback. The reception component 704 may be configured to receive, from the base station, a second configuration to operate with any one of the plurality of channel codes as a reference code for CSI feedback. The transmission component 712 may be configured to send CSI feedback encoded with the reference code to the base station 750. The reception component 704 may be configured to receive, from the base station, a second configuration to operate with one of the plurality of channel codes for UL communication and another one of the plurality of channel codes for DL communication. The reception component 704 may be configured to send the second configuration to the channel code determination component 708 and/or the decoding component 710. The apparatus may encode UL transmissions based on the second configuration, and the transmission component may transmit UL communication(s) encoded based on the second configuration to the base station 750. The reception component 704 may be configured to receive DL communication(s) from the base station 750. The DL communication(s) may be sent to the decoding component 710. The decoding component 710 may be configured to decode the DL communication(s) based at least in part on the second configuration.

The apparatus may include additional components that perform each of the blocks of the algorithm in the aforementioned flowcharts of FIGS. 6A-6C. As such, each block in the aforementioned flowcharts of FIGS. 6A-6C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
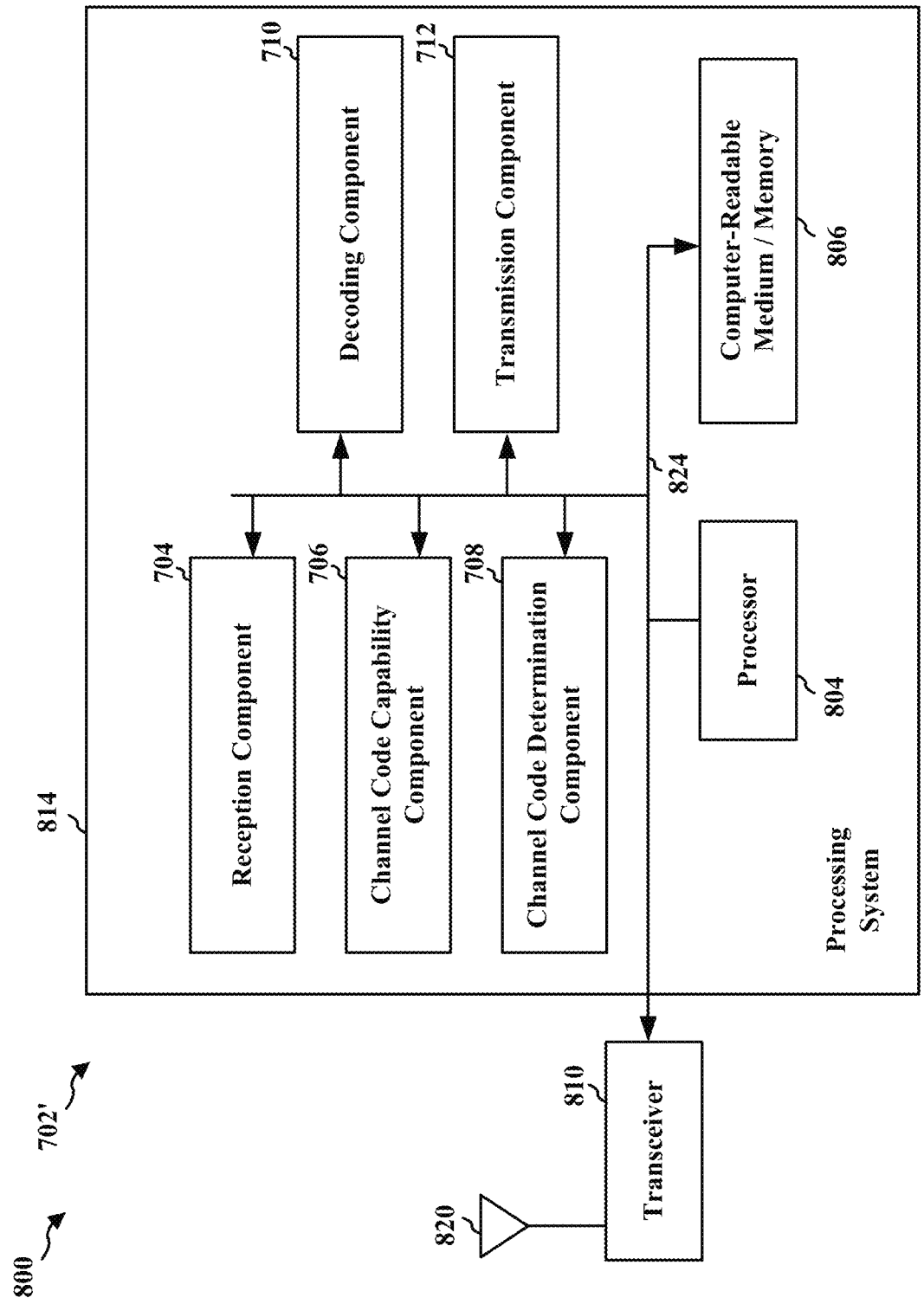
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In certain configurations, the apparatus 702/702' for wireless communication may include means for communicating with a base station using a baseline channel code. In certain other configurations, the apparatus 702/702' for wireless communication may include means for sending information to the base station indicating a capability of the UE to support a plurality of channel codes. In certain aspects, the plurality of channel codes may include the baseline channel code and one or more second channel codes. In certain other aspects, the baseline channel code may include one of TC, TBCC, a LDPC, URLLC, or a polar code. In certain other aspects, the information may be sent to the base station using the baseline channel code. In certain other configurations, the apparatus 702/702' for wireless communication may include means for receiving, from the base station, a configuration to operate with any one of the plurality of channel codes. In certain other configurations, the apparatus 702/702' for wireless communication may include means for determining whether the second set of resources is encoded with the baseline channel code or the second channel code based at least in part on the configuration received from the base station. In certain aspects, the means for determining whether the second set of resources is encoded with the baseline channel code or the second channel code may be configured to determine the second set of resources is encoded with the baseline channel code when the second set of resources is scheduled from a CSS. In certain other aspects, the means for determining whether the second set of resources is encoded with the baseline channel code or the second channel code may be configured to determine the second set of resources is encoded with the second channel code when the second set of resources is scheduled from a USS. In certain other aspects, the means for determining whether the second set of resources is encoded with the baseline channel code or the second channel code may be configured to determine the second set of resources is encoded with the second channel code based at least in part on DCI or an MCS associated with a previous channel code. In certain other aspects, the means for determining whether the second set of resources is encoded with the baseline channel code or the second channel code may be configured to determine the second set of resources is encoded with the baseline channel code when the UE is configured with a first type of RNTI. In certain other aspects, the means for determining whether the second set of resources is encoded with the baseline channel code or the second channel code may be configured to determine the second set of resources is encoded with the second channel code when the UE is configured with a second type of RNTI. In certain other aspects, the means for determining whether the second set of resources is encoded with the baseline channel code or the second channel code may be configured to determine the second set of resources is encoded with the baseline channel code when a TBS associated with the second set of resources is less than a threshold size. In certain other aspects, the means for determining whether the second set of resources is encoded with the baseline channel code or the second channel code may be configured to determine the second set of resources is encoded with the second channel code when the TBS associated with the second set of resources is greater than or equal to the threshold size. In certain other aspects, the means for determining whether the second set of resources is encoded with the baseline channel code or the second channel code may be configured to determine the second set of resources is encoded with the baseline channel code when a resource assignment associated with the second set of resources is less than a threshold number of PRBs. In certain other aspects, the means for determining whether the second set of resources is encoded with the baseline channel code or the second channel code may be configured to determine the second set of resources is encoded with the second channel code when the resource assignment associated with the second set of resources is greater than or equal to the threshold number of PRBs. In certain other aspects, the means for determining whether the second set of resources is encoded with the baseline channel code or the second channel code may be configured to determine the second set of resources is encoded with the baseline channel code when a number of repetitions sent using the second set of resources is less than a threshold number of repetitions. In certain other aspects, the means for determining whether the second set of resources is encoded with the baseline channel code or the second channel code may be configured to determine the second set of resources is encoded with the second channel code when the number of repetitions sent using the second set of resources is greater than or equal to the threshold number of repetitions. In certain other configurations, the apparatus 702/702' for wireless communication may include means for receiving a first set of resources and a second set of resources from the base station. In certain aspects, the first set of resources may be encoded with the baseline channel code and the second set of resources may be encoded with one of the baseline channel code or a second channel code of the one or more second channel codes. In certain other aspects, the second channel code includes one of TC, TBCC, LDPC, URLLC, or a polar code. In certain other aspects, the second set of resources may include one or more shared channel assignments encoded with the second channel code. In certain other aspects, the second channel code includes an enhanced channel code and the enhanced channel code is a reference code for CSI feedback. In certain other aspects, the first set of resources and the second set of resources may be received in a same subframe. In certain other aspects, the first set of resources may be received in a first set of code blocks and the second set of resources are received in a second set of code blocks in the same subframe. In certain other aspects, the first set of code blocks and the second set of code blocks may be included in a same transport block. In certain other configurations, the apparatus 702/702' for wireless communication may include means for decoding the first set of resources and second set of resources using the baseline channel code and/or the second channel code. In certain other configurations, the apparatus 702/702' for wireless communication may include means for sending additional information to the base station indicating a preferred channel code for the CSI feedback. In certain other configurations, the apparatus 702/702' for wireless communication may include means for receiving, from the base station, a second configuration to operate with any one of the plurality of channel codes as a reference code for CSI feedback. In certain other configurations, the apparatus 702/702' for wireless communication may include means for receiving, from the base station, a second configuration to operate with one of the plurality of channel codes for UL communication and another one of the plurality of channel codes for DL communication. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
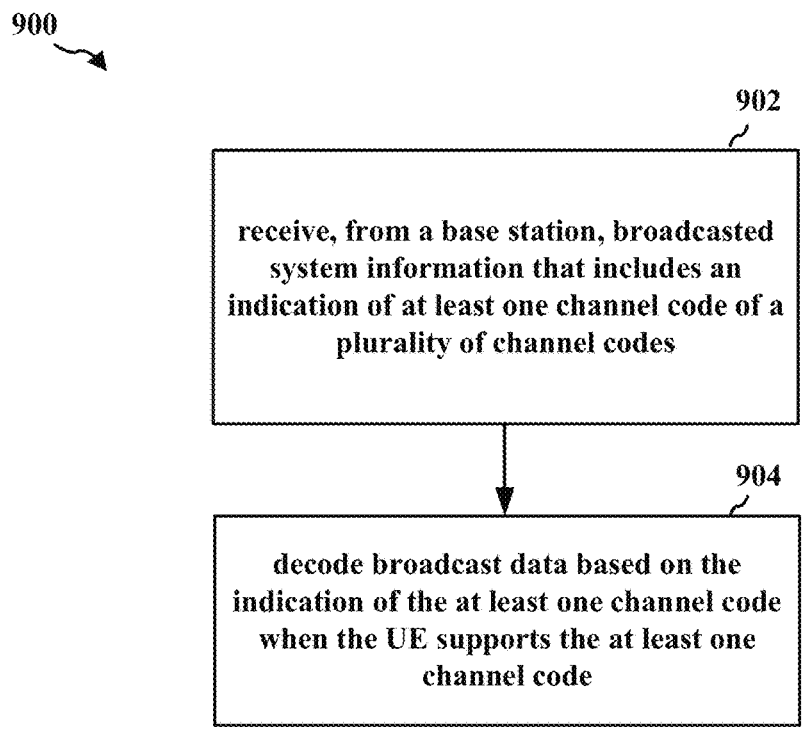
FIG. 9 is a flowchart illustrating methods of wireless communication in accordance with aspect of the present disclosure.

FIG. 9 is a flowchart 900 of a method of wireless communication. The method may be performed by a UE (e.g., UE 104, 350, 502, 1350, the apparatus 702/702', 1002/1002').

At 902, the UE may receive, from a base station, first broadcasted system information and second broadcasted system information. In certain aspects, the first broadcasted system information may be encoded with a first channel code. In certain other aspects, the first broadcasted system information may include an indication that the second broadcasted system information is encoded with the second channel code. For example, referring to FIG. 5E, the UE 502 may receive (at 553), from a base station, first broadcasted system information and second broadcasted system information. In certain aspects, the first broadcasted system information may be encoded with a first channel code. In certain other aspects, the first broadcasted system information may include an indication that the second broadcasted system information is encoded with the second channel code. For broadcast services based on shared channel, such as a SC-PTM or a PMCH, the base station 504 may determine to send the broadcast services based on a first channel code or a second channel code. The information indicating which channel code to use may be broadcast in system information or the multicast logical channel (e.g., SC-MCCH). The channel code indication can be interpreted as the configuration received (at 505) in FIG. 5A, in which case the UE 502 may determine the code based on one or more of operations 507-529 described above in connection with any of FIGS. 5A-5C. For SC-PTM, the base station 504 may have different UE groupings based on the supported channel codes. For example, the base station 504 may group a first set of UEs that each support TC or LDPC, and hence, broadcast data for the first set of UEs may be encoded with TC or LDPC. The base station 504 may group a second set of UEs that each support another channel code, such as URLLC. In this example, broadcast data for the second set of UEs may be encoded with URLLC.

At 904, the UE may decode broadcast data based on the indication of the second channel code when the UE supports the second channel code. For example, referring to FIG. 5E, when the UE 502 supports the second channel code, the UE 502 may decode (at 555) broadcast data (e.g., MBMS/SC-PTM service).

Figure 10:
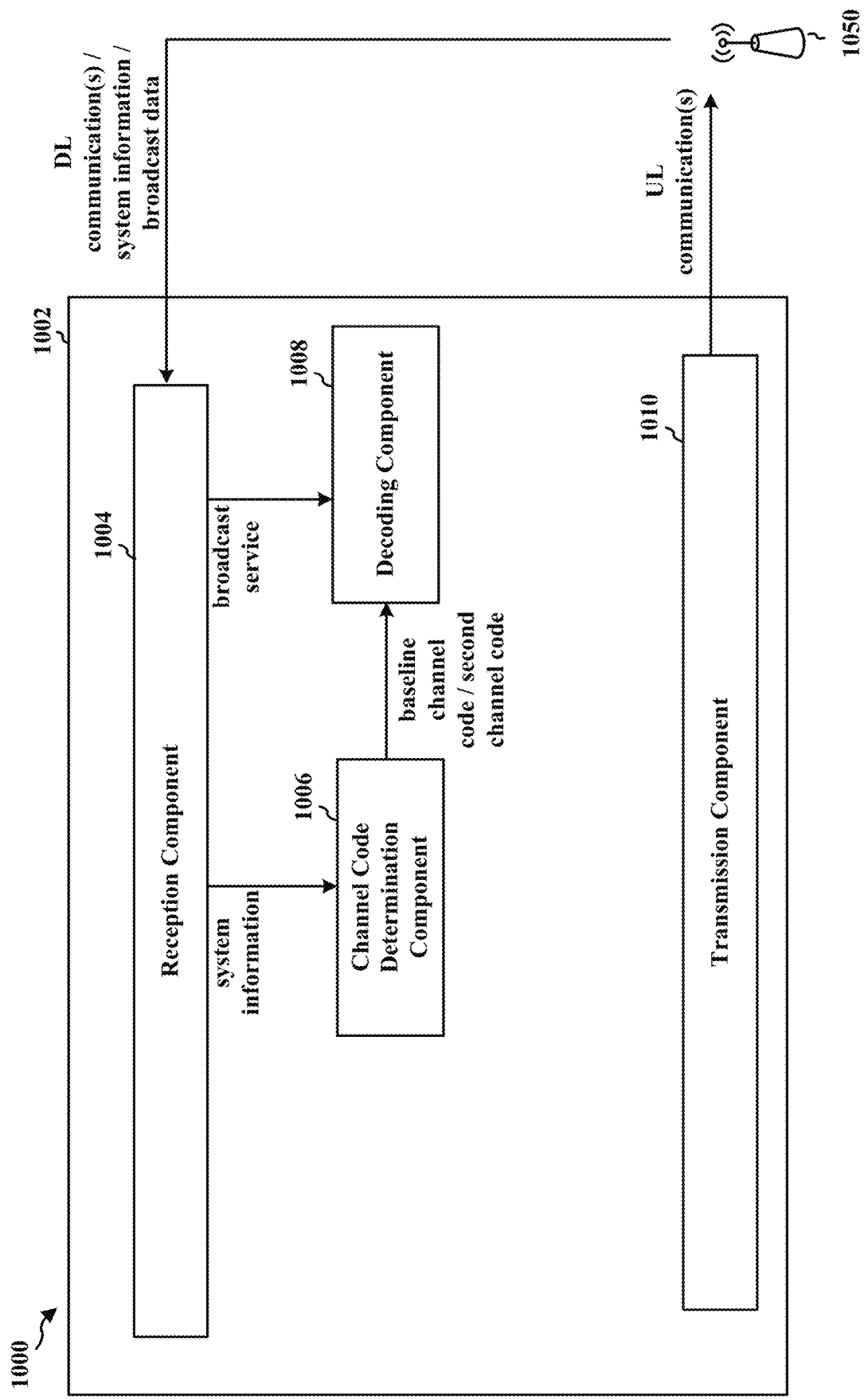
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 502, 1350, the apparatus 702/702', 1002') in communication with a base station 1050 (e.g., base station 102, 180, 310, 750, apparatus 1302/1302'). The apparatus may include a reception component 1004, a channel code determination component 1006, a decoding component 1008, and a transmission component 1010.

The reception component 1004 may be configured to receive, from the base station 1050, first broadcasted system information and second broadcasted system information. In certain aspects, the first broadcasted system information may be encoded with a first channel code. In certain other aspects, the first broadcasted system information may include an indication that the second broadcasted system information is encoded with the second channel code. The reception component 1004 may be configured to send the first system information and/or second system information to the channel code determination component 1006.

The channel code determination component 1006 may be configured to determine if the second channel code is supported by the apparatus. The channel code determination component 1006 may send a signal indicating the second channel code to the decoding component 1008.

The reception component 1004 may be configured to receive broadcast data from the base station 1050. The broadcast data may be sent to the decoding component 1008.

The decoding component 1008 may be configured to decode broadcast data based on the indication of the second channel code when the UE supports the second channel code.

The transmission component 1010 may be configured to send UL communication(s) to the base station 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
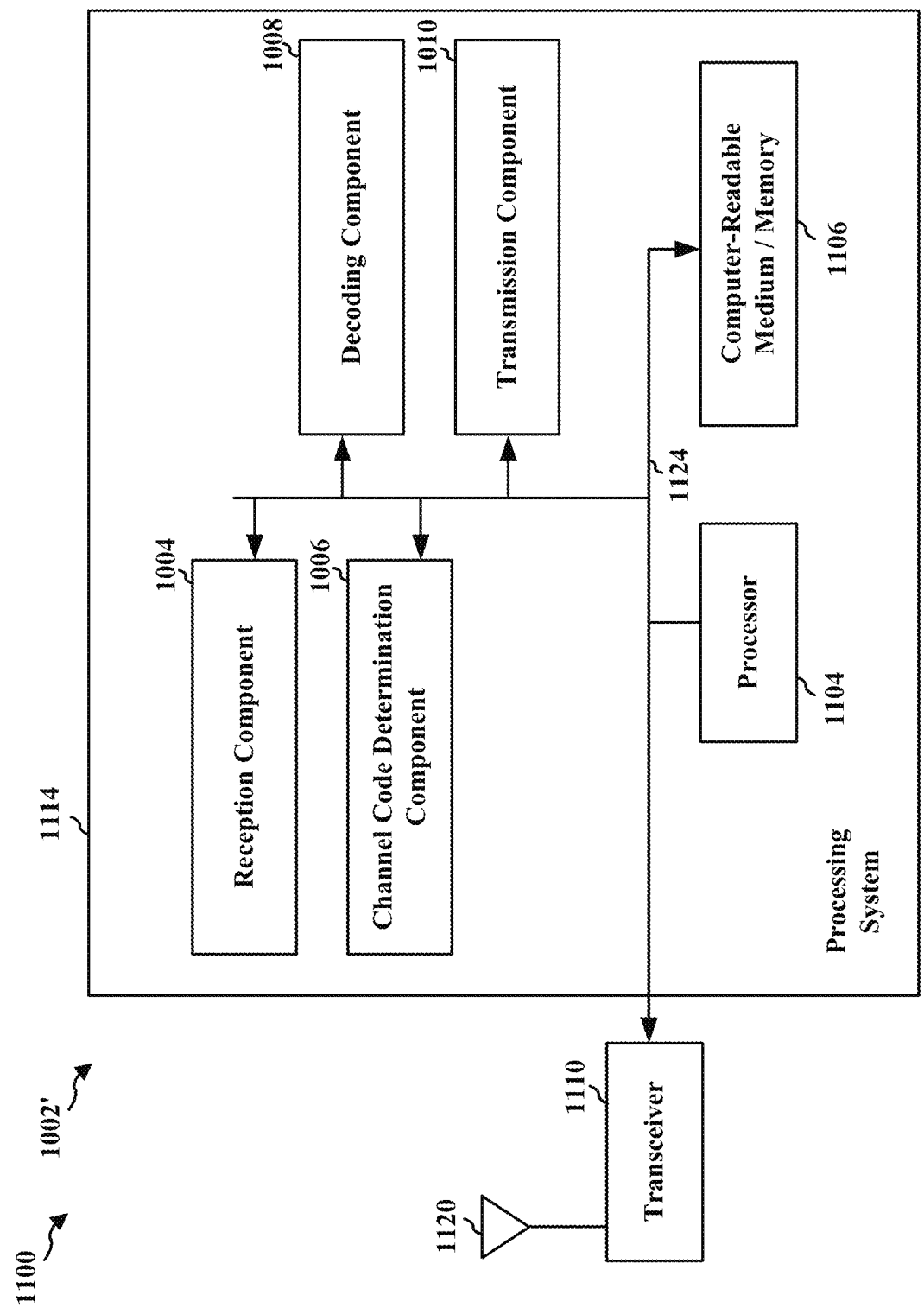
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In certain configurations, the apparatus 1002/1002' for wireless communication may include means for receiving, from a base station, first broadcasted system information and second broadcasted system information. In certain aspects, the first broadcasted system information may be encoded with a first channel code. In certain other aspects, the first broadcasted system information may include an indication that the second broadcasted system information is encoded with the second channel code. In certain other configurations, the apparatus 1002/1002' for wireless communication may include means for decoding broadcast data based on the indication of the second channel code when the UE supports the second channel code. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
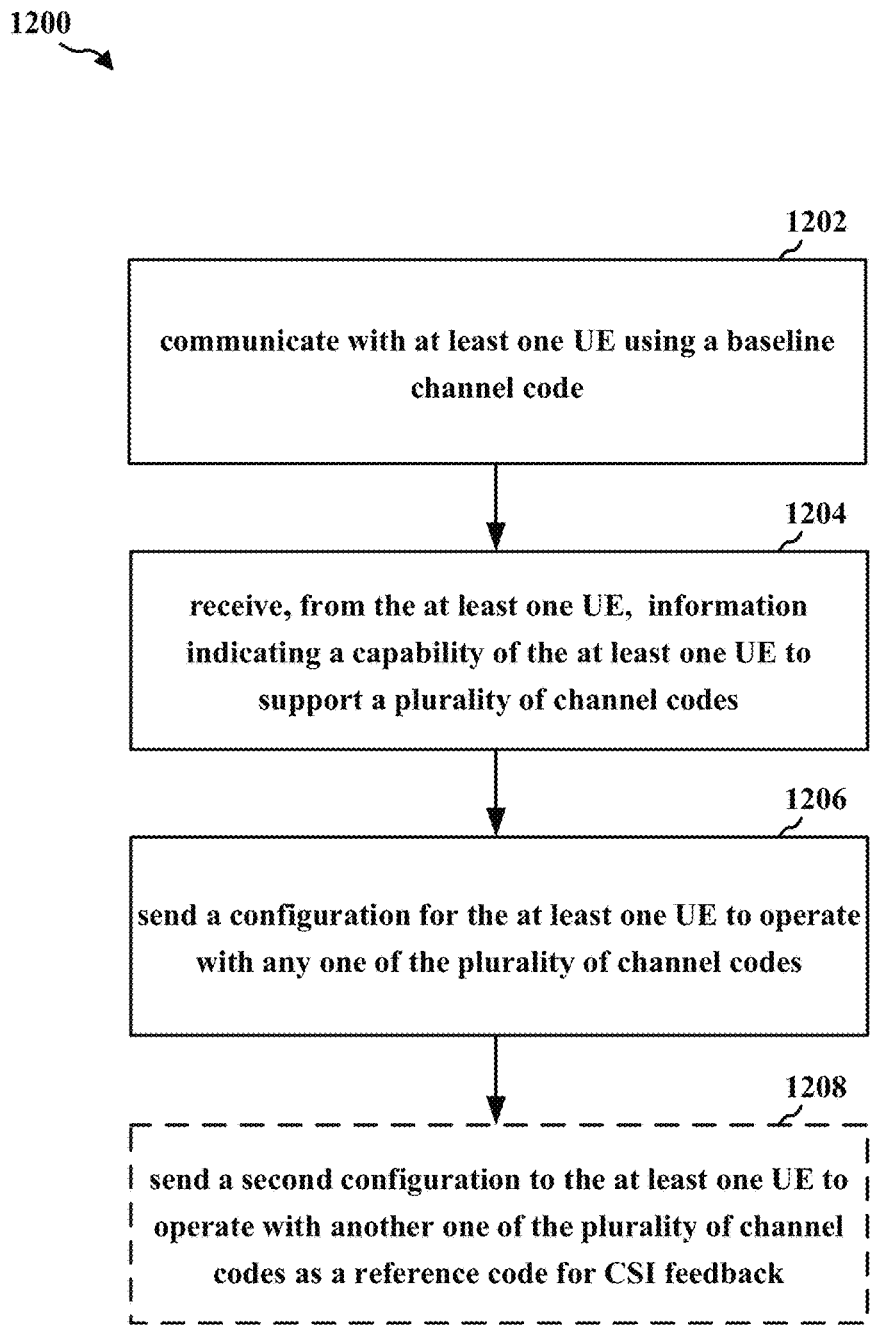
FIG. 12 is a flowchart illustrating methods of wireless communication in accordance with aspect of the present disclosure.

FIG. 12 is a flowchart 1200 of a method of wireless communication. The method may be performed by a base station (e.g., base station 102, 180, 310, 750, 1050, apparatus 1302/1302'). In FIG. 12, optional operations are indicated with dashed lines.

At 1202, the base station may communicate with at least one UE using a baseline channel code. For example, referring to FIG. 5A, the UE 502 may establish (at 501) communication with a network via base station 504. During initial access, the UE 502 may access the network using a baseline code for a shared channel. The baseline code may, for example, include one of TC, TBCC, LDPC, URLLC, or a polar code depending on which type of RAT is used for communications (at 501) between the UE 502 and the base station 504.

At 1204, the base station may receive, from the at least one UE, information indicating a capability of the at least one UE to support a plurality of channel codes. In certain aspects, the plurality of channel codes may include the baseline channel code. In certain aspects, the baseline channel code may include one of TC, TBCC, a LDPC, URLLC, or a polar code. In certain other aspects, the information received from the UE may be encoded using the baseline channel code. For example, referring to FIG. 5A, the UE 502 may send (at 503) information to the base station 504 indicating the capability to support multiple channel codes. That is, the UE 502 may explicitly or implicitly provide an indication that it supports one or more additional codes addition to the baseline code. When an explicit indication of the supported channel codes is provided, the UE 502 may send a message that includes a bitmap indicating which from a list of possible channel codes are supported by the UE 502. When an implicit indicate of the supported channel codes is provided, the UE 502 may send a message indicating which RAT(s) the UE 502 supports, and hence, which channel codes are also supported by the UE 502.

At 1206, the base station may send a configuration for the at least one UE to operate with one of the plurality of channel codes. In certain aspects, the configuration sent to the at least one UE may configure the at least one UE to operate with a second channel code of the plurality of channel codes. In certain aspects, the second channel code being different than the baseline channel code. In certain other aspects, the second channel code includes another one of the TC, the TBCC, the LDPC, URLLC, or the polar code. For example, referring to FIG. 5A, base station 504 may send (at 505) a configuration to operate with any one of the plurality of channel codes to the UE 502. For example, the configuration may be conveyed by the base station 504 using, e.g., a CSS, a USS, DCI, an MCS, a TBS, a number of PRBs, and/or a number of repeated transmissions, just to name a few.

At 1208, the base station may send a second configuration to the at least one UE to operate with another one of the plurality of channel codes as a reference code for CSI feedback. For example, referring to FIG. 5D, the base station 504 may transmit (at 537) a second configuration instructing the UE 502 to operate with any one of the plurality of channel codes as a reference code for CSI feedback. In certain configurations, the second configuration may be for the preferred channel code indicated by the UE 502 in operation 535.

Figure 13:
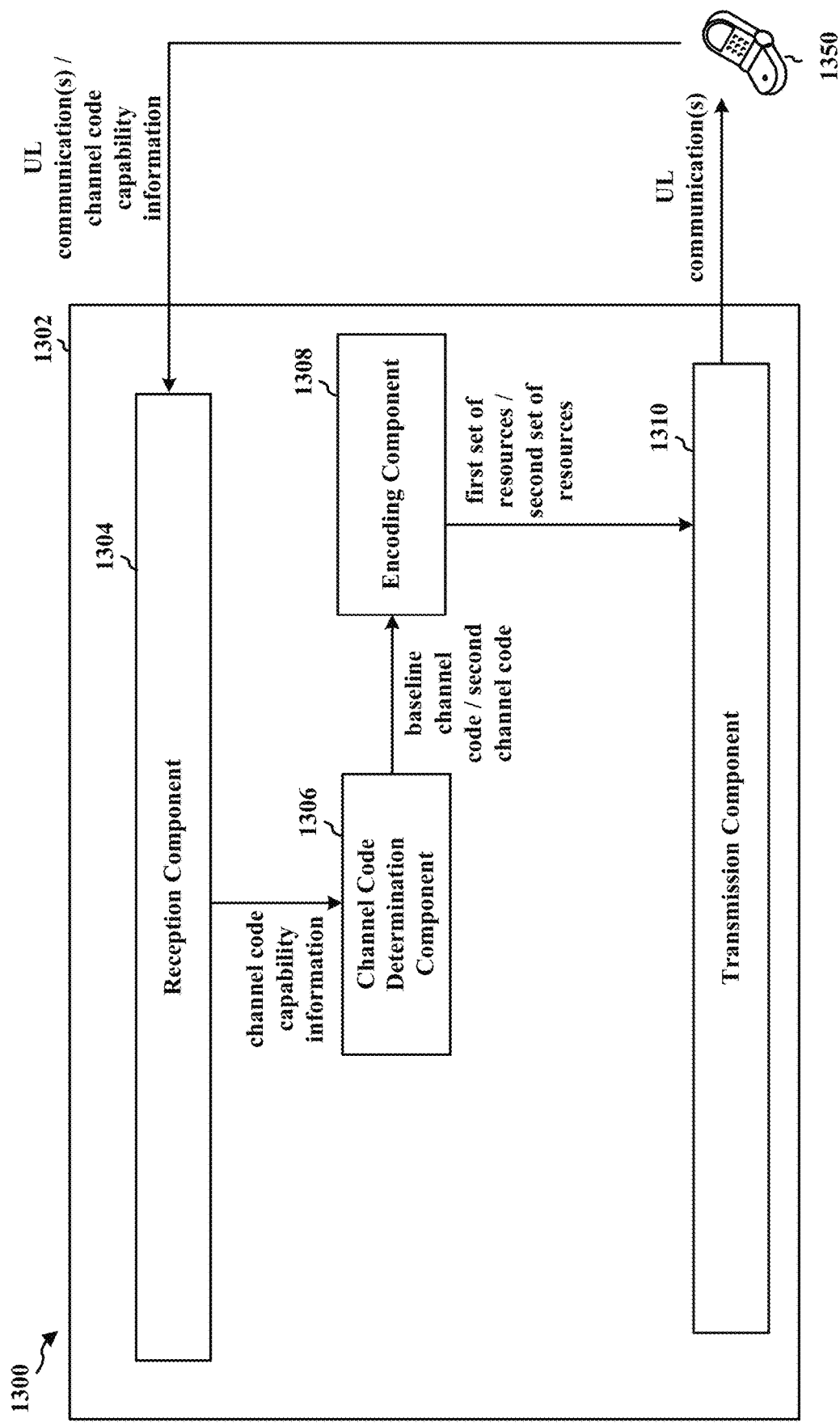
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station (e.g., base station 102, 180, 310, 750, 1050, apparatus 1302') in communication with a UE 1350 (e.g., UE 104, 350, 502, the apparatus 702/702', 1002/1002'). The apparatus may include a reception component 1304, a channel code determination component 1306, an encoding component 1308, and a transmission component 1310.

One or more of the reception component 1304 and/or the transmission component 1310 may be configured to communicate with at least one UE 1350 using a baseline channel code.

The reception component 1304 may be configured to receive, from the at least one UE 1350, information indicating a capability of the at least one UE 1350 to support a plurality of channel codes. In certain aspects, the plurality of channel codes may include the baseline channel code. In certain aspects, the baseline channel code may include one of TC, TBCC, a LDPC, URLLC, or a polar code. In certain other aspects, the information received from the UE may be encoded using the baseline channel code. The information indicating the capability of the at least one UE 1350 may be sent to the channel code determination component 1306.

The channel code determination component 1306 may be configured to select a channel code for use in encoding a second set of resources (e.g., shared channel resources) based at least in part on the information indicating the capability of the at least one UE 1350. The selected channel code may be sent to the encoding component 1308 and the transmission component 1310.

The transmission component 1310 may be configured to send a configuration for the at least one UE 1350 to operate with one of the plurality of channel codes.

The apparatus may generate a first set of resources and a second set of resources that are sent to the encoding component 1308. The encoding component 1308 may be configured to encode the first set of resources using the baseline channel code and the second set of resources using the second channel code. The encoded first set of resources and the encoded second set of resources may be sent to the transmission component 1310.

The transmission component 1310 may be configured to transmit the encoded first set of resources and the encoded second set of resources to the at least one UE 1350.

The channel code determination component 1306 may be configured to select a channel code for CSI feedback for use by the at least one UE 1350. The channel code for CSI feedback may be sent to the transmission component 1310. The transmission component 1310 may be configured to send a second configuration to the at least one UE to operate with another one of the plurality of channel codes as a reference code for CSI feedback.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
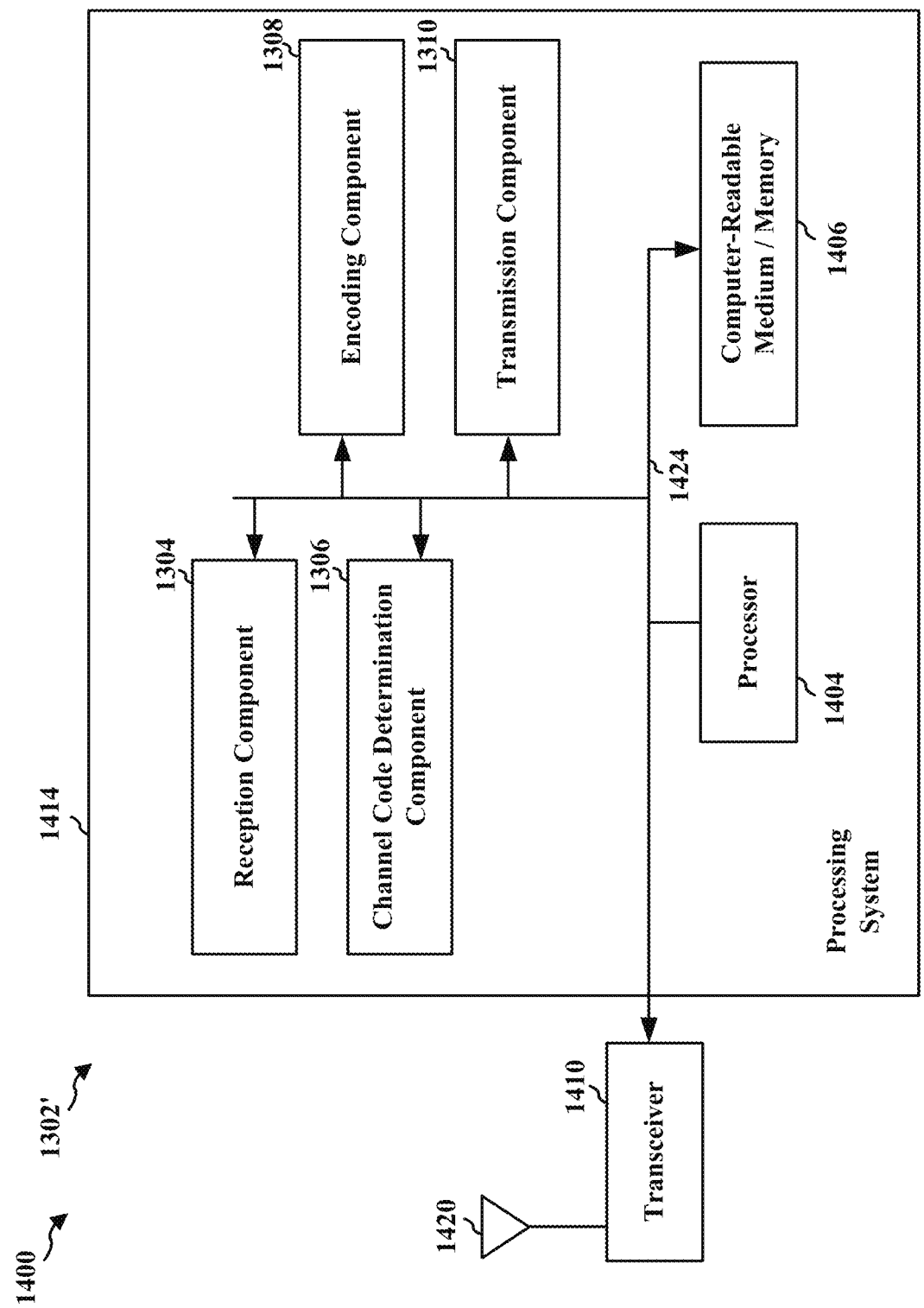
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In certain configurations, the apparatus 1302/1302' for wireless communication may include means for communicating with at least one UE using a baseline channel code. In certain other configurations, the apparatus 1302/1302' for wireless communication may include means for receiving, from the at least one UE, information indicating a capability of the at least one UE to support a plurality of channel codes. In certain aspects, the plurality of channel codes may include the baseline channel code. In certain aspects, the baseline channel code may include one of TC, TBCC, a LDPC, URLLC, or a polar code. In certain other aspects, the information received from the UE may be encoded using the baseline channel code. In certain other configurations, the apparatus 1302/1302' for wireless communication may include means for sending a configuration for the at least one UE to operate with one of the plurality of channel codes. In certain aspects, the configuration sent to the at least one UE may configure the at least one UE to operate with a second channel code of the plurality of channel codes. In certain aspects, the second channel code being different than the baseline channel code. In certain other aspects, the second channel code includes another one of the TC, the TBCC, the LDPC, URLLC, or the polar code. In certain other configurations, the apparatus 1302/1302' for wireless communication may include means for sending a second configuration to the at least one UE to operate with another one of the plurality of channel codes as a reference code for CSI feedback. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   communicating with a base station using a baseline channel code;
   sending information to the base station indicating a capability of the UE to support a plurality of channel codes, the plurality of channel codes including the baseline channel code and one or more second channel codes;
   receiving, from the base station, a configuration to operate with any one of the plurality of channel codes, wherein the configuration is based on the baseline channel code; and
   receiving a first set of resources and a second set of resources from the base station, the first set of resources being encoded with the baseline channel code and the second set of resources being encoded with one of the baseline channel code or a second channel code of the one or more second channel codes.

2. The method of claim 1, wherein the baseline channel code includes one of a turbo code, a tail-biting convolutional code, a low density parity check, or a polar code.

3. The method of claim 2, wherein the second channel code includes one of the turbo code, the tail-biting convolutional code, the low density parity check, or the polar code.

4. The method of claim 1, wherein the second set of resources includes one or more shared channel assignments encoded with the second channel code.

5. The method of claim 1, further comprising determining whether the second set of resources is encoded with the baseline channel code or the second channel code based at least in part on the configuration received from the base station.

6. The method of claim 5, wherein the determining whether the second set of resources is encoded with the baseline channel code or the second channel code comprises:
determining the second set of resources is encoded with the baseline channel code when the second set of resources is scheduled from a common search space (CSS); and
determining the second set of resources is encoded with the second channel code when the second set of resources is scheduled from a UE specific search space (USS).

7. The method of claim 5, wherein the determining whether the second set of resources is encoded with the baseline channel code or the second channel code comprises:
determining the second set of resources is encoded with the second channel code based at least in part on downlink control information (DCI) or a modulation coding scheme (MCS) associated with a previous channel code.

8. The method of claim 5, wherein the determining whether the second set of resources is encoded with the baseline channel code or the second channel code comprises:
determining the second set of resources is encoded with the baseline channel code when the UE is configured with a first type of radio network temporary identifier (RNTI); and
determining the second set of resources is encoded with the second channel code when the UE is configured with a second type of RNTI.

9. The method of claim 5, wherein the determining whether the second set of resources is encoded with the baseline channel code or the second channel code comprises:
determining the second set of resources is encoded with the baseline channel code when a transport block size (TBS) associated with the second set of resources is less than a threshold size; and
determining the second set of resources is encoded with the second channel code when the TBS associated with the second set of resources is greater than or equal to the threshold size.

10. The method of claim 5, wherein the determining whether the second set of resources is encoded with the baseline channel code or the second channel code comprises:
determining the second set of resources is encoded with the baseline channel code when a resource assignment associated with the second set of resources is less than a threshold number of physical resource blocks (PRBs); and
determining the second set of resources is encoded with the second channel code when the resource assignment associated with the second set of resources is greater than or equal to the threshold number of PRBs.

11. The method of claim 5, wherein the determining whether the second set of resources is encoded with the baseline channel code or the second channel code comprises:
determining the second set of resources is encoded with the baseline channel code when a number of repetitions sent using the second set of resources is less than a threshold number of repetitions; and
determining the second set of resources is encoded with the second channel code when the number of repetitions sent using the second set of resources is greater than or equal to the threshold number of repetitions.

12. The method of claim 1, wherein the second channel code includes an enhanced channel code for channel state information (CSI) feedback.

13. The method of claim 12, further comprising sending additional information to the base station indicating a preferred channel code for the CSI feedback.

14. The method of claim 1, further comprising receiving, from the base station, a second configuration to operate with any one of the plurality of channel codes for channel state information (CSI) feedback.

15. The method of claim 1, wherein the first set of resources and the second set of resources are received in a same subframe.

16. The method of claim 15, wherein the first set of resources are received in a first set of code blocks and the second set of resources are received in a second set of code blocks in the same subframe.

17. The method of claim 16, wherein the first set of code blocks and the second set of code blocks are included in a same transport block.

18. The method of claim 1, further comprising receiving, from the base station, a second configuration to operate with one of the plurality of channel codes for uplink (UL) communication and another one of the plurality of channel codes for downlink (DL) communication.

19. The method of claim 1, wherein the information is sent to the base station using the baseline channel code.

20. The method of claim 1, wherein the baseline channel code depends on a type of radio access technology that is used for the communication between the UE and the base station.

21. A method of wireless communication of a user equipment (UE), comprising:
receiving, from a base station, first broadcasted system information and second broadcasted system information, the first broadcasted system information being encoded with a first channel code, the first broadcasted system information including an indication that the second broadcasted system information is encoded with a second channel code; and
decoding the second broadcasted system information based on the indication of the second channel code when the UE supports the second channel code.

22. A method of wireless communication, comprising:
communicating with at least one UE using a baseline channel code;
receiving, from the at least one UE, information indicating a capability of the at least one UE to support a plurality of channel codes, the plurality of channel codes including the baseline channel code; and sending a configuration for the at least one UE to operate with one of the plurality of channel codes, wherein the configuration sent based on the baseline channel code.

23. The method of claim 22, wherein the configuration sent to the at least one UE configures the at least one UE to operate with a second channel code of the plurality of channel codes, the second channel code being different than the baseline channel code.

24. The method of claim 23, wherein the baseline channel code includes one of a turbo code, a tail-biting convolutional code, a low density parity check, or a polar code.

25. The method of claim 24, wherein the second channel code includes another one of the turbo code, the tail-biting convolutional code, the low density parity check, or the polar code.

26. The method of claim 23, further comprising sending a second configuration to the at least one UE to operate with another one of the plurality of channel codes for channel state information (CSI) feedback.

27. The method of claim 22, wherein the information received from the UE is encoded using the baseline channel code.

28. An apparatus for wireless communication of a user equipment (UE), comprising:
a memory, and
at least one processor coupled to the memory and configured to:
communicate with a base station using a baseline channel code;
sending information to the base station indicating a capability of the UE to support a plurality of channel codes, the plurality of channel codes including the baseline channel code and one or more second channel codes;
receive, from the base station, a configuration to operate with any one of the plurality of channel codes, wherein the configuration is based on the baseline channel code; and
receive a first set of resources and a second set of resources from the base station, the first set of resources being encoded with the baseline channel code and the second set of resources being encoded with one of the baseline channel code or a second channel code of the one or more second channel codes.

29. The apparatus of claim 26, wherein:
the baseline channel code includes one of a turbo code, a tail-biting convolutional code, a low density parity check, or a polar code, and
the second channel code includes one of the turbo code, the tail-biting convolutional code, the low density parity check, or the polar code.

30. The apparatus of claim 28, wherein the second set of resources includes one or more shared channel assignments encoded with the second channel code.

31. The apparatus of claim 28, wherein the at least one processor is further configured to determine whether the second set of resources is encoded with the baseline channel code or the second channel code based at least in part on the configuration received from the base station.

32. A method of wireless communication of a user equipment (UE), comprising:
communicating with a base station using a baseline channel code;
sending information to the base station using the baseline channel code, the information indicating a capability of the UE to support a plurality of channel codes, the plurality of channel codes including the baseline channel code and one or more second channel codes;
receiving, from the base station, a configuration to operate with any one of the plurality of channel codes; and
receiving a first set of resources and a second set of resources from the base station, the first set of resources being encoded with the baseline channel code and the second set of resources being encoded with one of the baseline channel code or a second channel code of the one or more second channel codes.

33. A method of wireless communication of a user equipment (UE), comprising:
communicating with a base station using a baseline channel code;
sending information to the base station indicating a capability of the UE to support a plurality of channel codes, the plurality of channel codes including the baseline channel code and one or more second channel codes;
receiving, from the base station, a configuration to operate with any one of the plurality of channel codes, wherein the UE uses the baseline channel code during initial access; and
receiving a first set of resources and a second set of resources from the base station, the first set of resources being encoded with the baseline channel code and the second set of resources being encoded with one of the baseline channel code or a second channel code of the one or more second channel codes.

* * * * *